United States Patent [19]

Suzuki et al.

[11] Patent Number: 4,907,188

[45] Date of Patent: Mar. 6, 1990

[54] IMAGE INFORMATION SEARCH NETWORK SYSTEM

[75] Inventors: Toshiaki Suzuki; Masaaki Mukushi, both of Tokyo; Tatsumi Ono, Saitama, all of Japan

[73] Assignee: Kabushiki Kaisha Toshiba, Kawasaki, Japan

[21] Appl. No.: 906,078

[22] Filed: Sep. 10, 1986

[30] Foreign Application Priority Data

| Sep. 12, 1985 | [JP] | Japan | 60-202105 |
| Sep. 12, 1985 | [JP] | Japan | 60-202106 |
| Sep. 12, 1985 | [JP] | Japan | 60-202107 |
| Sep. 12, 1985 | [JP] | Japan | 60-202108 |
| Sep. 12, 1985 | [JP] | Japan | 60-202109 |
| Sep. 12, 1985 | [JP] | Japan | 60-202110 |

[51] Int. Cl.$^4$ ............ G06F 7/10; G06F 15/40
[52] U.S. Cl. .................................. 364/900
[58] Field of Search ... 364/200 MS File, 900 MS File, 364/418

[56] References Cited

U.S. PATENT DOCUMENTS

| 4,513,390 | 4/1985 | Walter et al. | 364/900 |
| 4,573,083 | 2/1986 | Shimizu | 340/825.52 X |
| 4,587,633 | 5/1986 | Wang et al. | 364/900 |
| 4,617,596 | 10/1986 | Yoshida et al. | 382/57 X |
| 4,653,112 | 3/1987 | Ouimette | 382/69 |
| 4,675,908 | 6/1987 | Saito et al. | 382/47 X |
| 4,685,070 | 8/1987 | Finchbaugh | 364/518 X |
| 4,688,168 | 8/1987 | Gudaitis et al. | 364/200 |
| 4,694,352 | 9/1987 | Ina et al. | 382/55 X |

*Primary Examiner*—David L. Clark
*Attorney, Agent, or Firm*—Finnegan, Henderson, Farabow, Garrett and Dunner

[57] ABSTRACT

In an image information search network system of the invention, image information file storing units of search stations installed at a plurality of different locations relatively distant from each other can commonly receive image information. Each image information file storing unit stores image information for a predetermined number of pages and an AWS (advanced work station) serving as a search terminal stores and displays image information for a designated page. File directory units for storing management information for searching image information are provided to some search stations, and are also used by the other search stations. An image information processing unit can be connected not only to a terminal control unit but also directly to the AWS. The terminal control unit is of a distributed processing type, and executes search processing for the respective AWSs. The terminal control unit can execute image file transfer processing and printing processing independently of the search processing. This allows independent control of the AWSs, a printer, and the image information file storing unit.

11 Claims, 22 Drawing Sheets

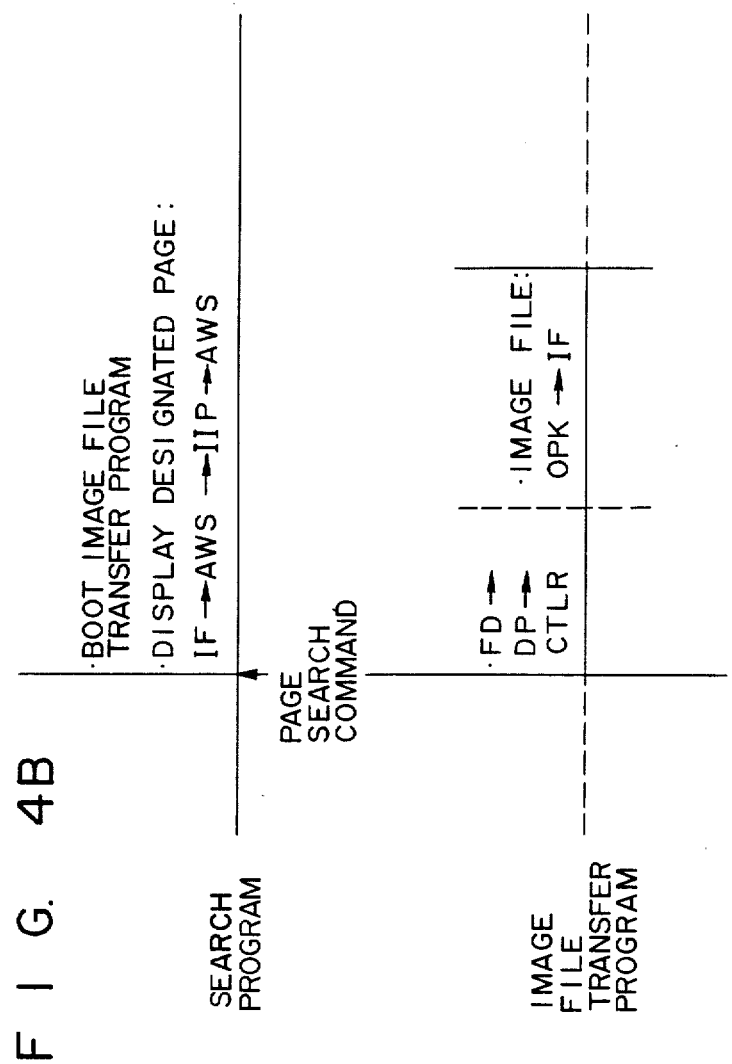

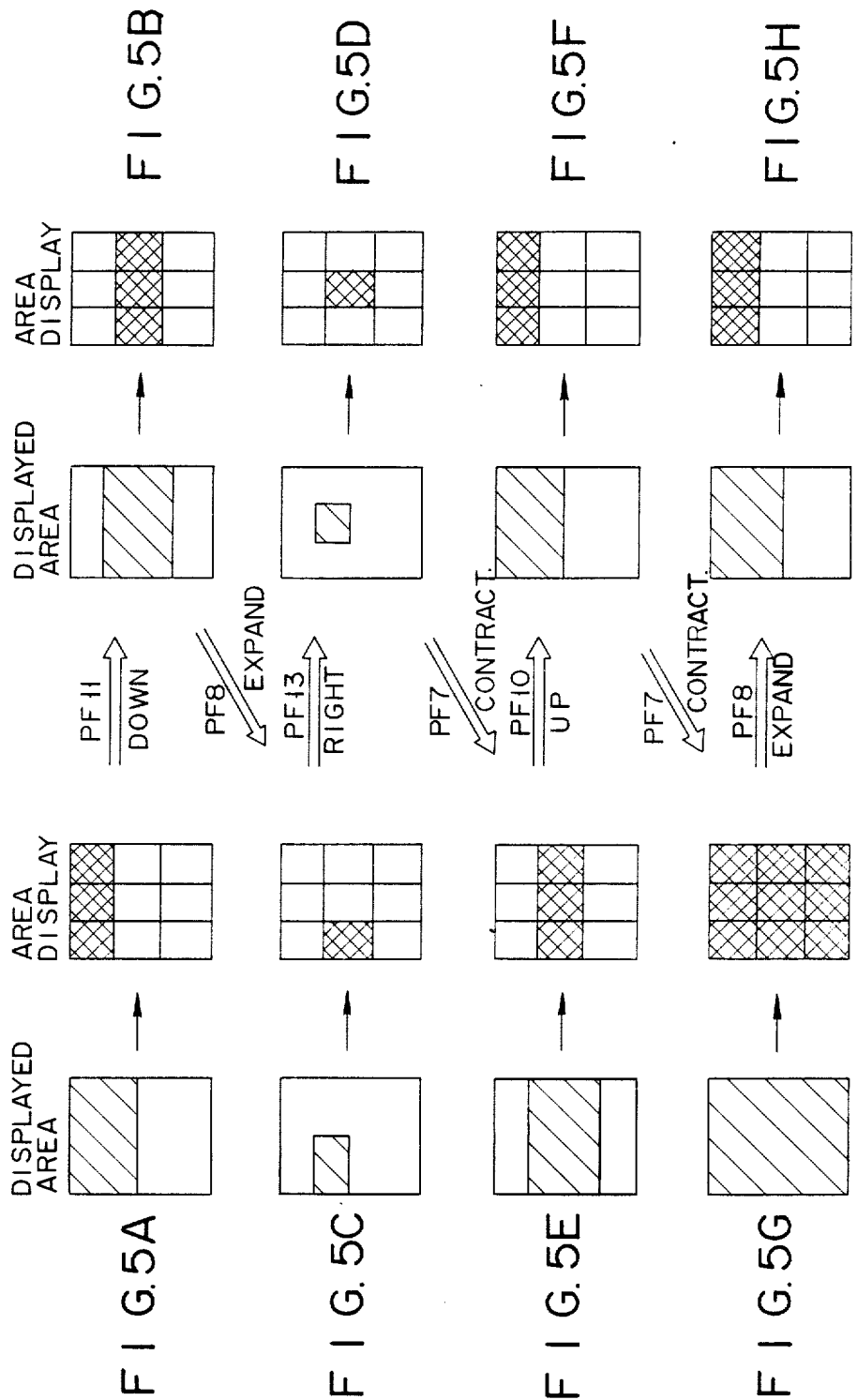

FIG. 6

| PF1 | docum.NO | ---- | DOCUMENT NUMBER. |
|---|---|---|---|
| PF2 | pre | ---- | DISPLAY PREVIOUS PAGE. |
| PF3 | next | ---- | DISPLAY NEXT PAGE. |
| PF4 | disp. | ---- | DISPLAY DESIGNATED PAGE. |
| PF5 | d.pri | ---- | PRINT DOCUMENT. |
| PF6 | p.pri | ---- | PRINT CURRENTLY DISPLAYED PAGE. |
| PF7 | cont. | ---- | EXPAND DISPLAYED AREA. |
| PF8 | expan. | ---- | CONTRACT DISPLAYED AREA. |
| PF9 | rotat. | ---- | ROTATE DISPLAYED DATA. |
| PF10 | up | ---- | MOVE DISPLAYED AREA UP. |
| PF11 | down | ---- | MOVE DISPLAYED AREA DOWN. |
| PF12 | left | ---- | MOVE DISPLAYED AREA LEFT. |
| PF13 | right | ---- | MOVE DISPLAYED AREA RIGHT. |
| PF14 | J.P.P | ---- | DISPLAY J.P PUBLICATION. |
| PF15 | end | ---- | RETURN TO INITIAL STATE. |
| HELP | menu | ---- | RETURN TO MENU. |

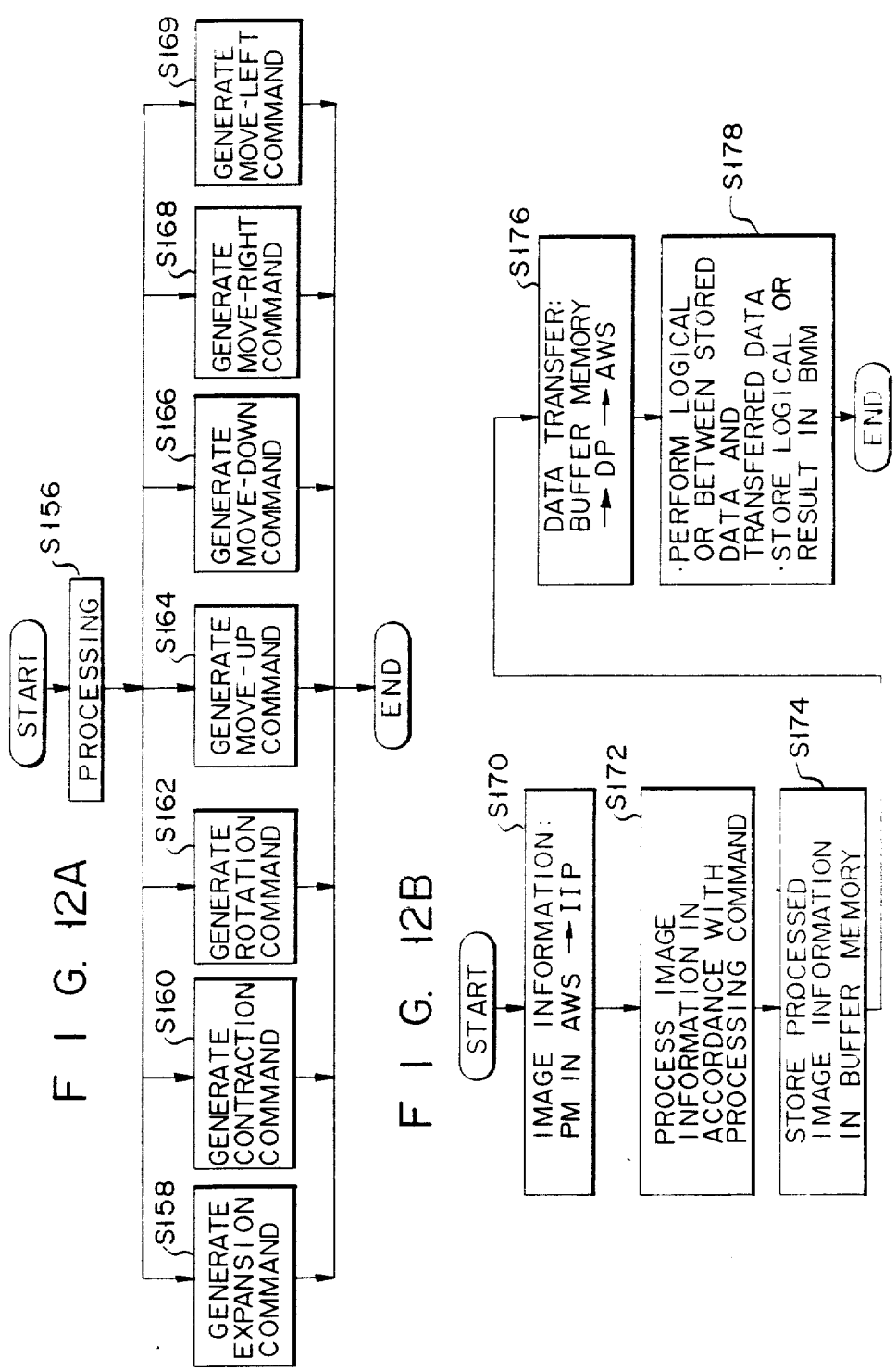

F I G. 14A

\*\* PATENT INFORMATION SEARCH SYSTEM \*\*    85 05 08

< menu >

Selection of object

1 Japanese Patent and Utility Model Publication

2 Abstract of the Publication

3 Abstract of U. S. Patent

Selection of Search Method

1 Direct search

2 Functional search

3 Applicant code table

4 Technical term table

9 End

Verify the selection (Y/N).

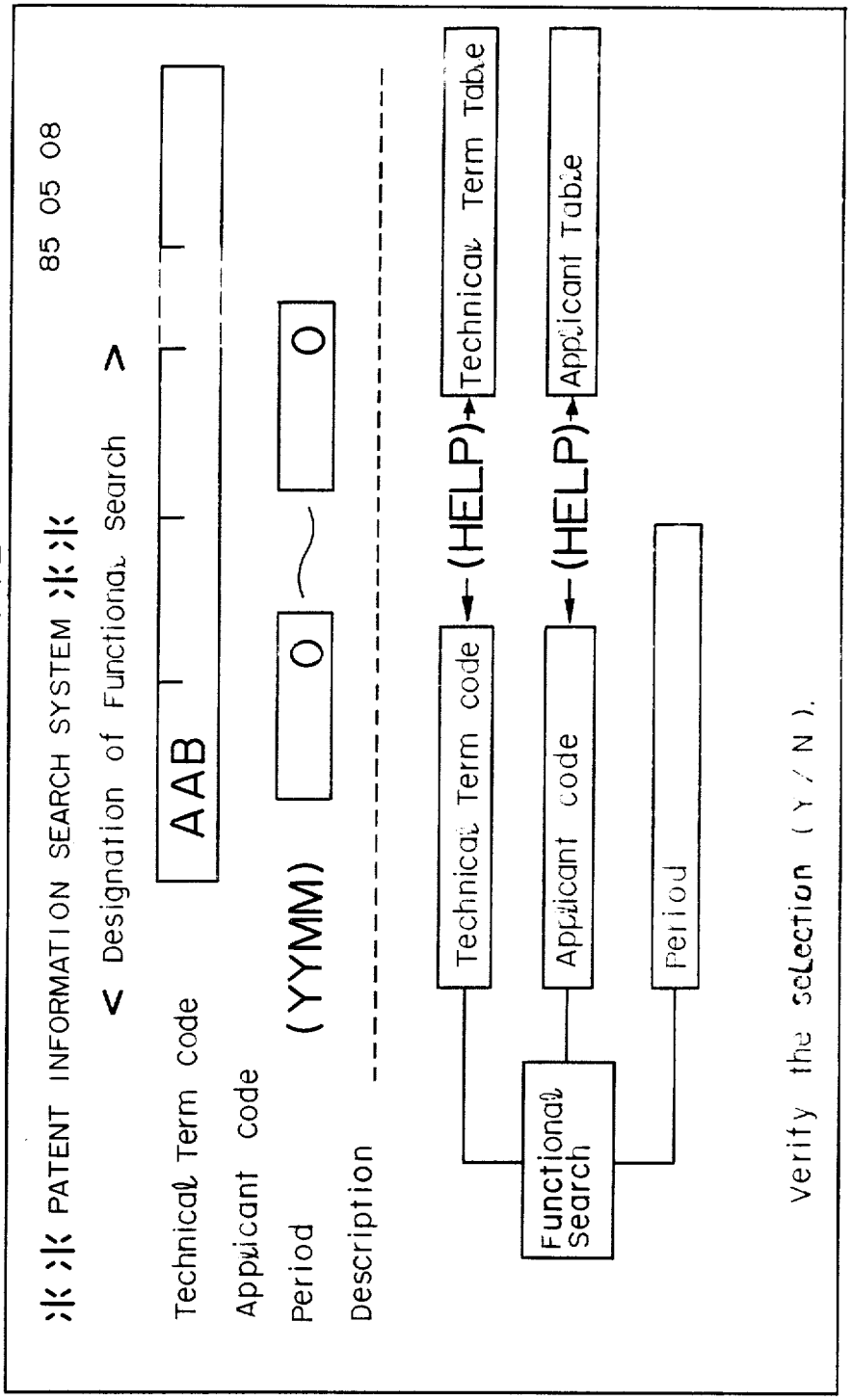

F I G. 14C

\*\* PATENT INFORMATION SEARCH SYSTEM \*\*   85 05 08

< Technical Term Code Table >

:AA   CPU

| SEQ | code | Description |
|-----|------|-------------|
| 01 | AAA | Program Control |
| 02 | AAB | Cache Memory |
| 03 | AAC | Command Executing Control |
| 04 | AAD | Interrupt Control |

Technical Term Code

| PF1 | PF2 | PF3 | ---- | ---- | PF15 |
|------|-----|------|------|------|------|
| desig | pre | next | ---- | ---- | end |

Press one of PF keys or input SEQ.

F I G. 14D

\*\*\* PATENT INFORMATION SEARCH SYSTEM \*\*\*  85 05 08

<< Applicant Code Table >>

| Code | Applicant | Code | Applicant |
|------|-----------|------|-----------|
| 151  | ○○○○      | 226  | ×○○○      |
| 378  | ○○×△      | 975  | ×○×△      |
| 408  | ○×○×      | 002  | ×△□×      |
| 437  | ××××      |      |           |

Applicant code

| PF1 | PF2 | PF3 | | | PF15 |
|-----|-----|-----|--|--|------|
| desig | pre | next | | | end |

Press PF1 key if applicant is designated.

FIG. 14E

**\*\* PATENT INFORMATION SEARCH SYSTEM \*\***　　85 05 08

Search : Period　　　Applicant　　　Technical Term
　　　　　0000 0000　　　AAB

| SEQ | J.Patent No | P. Date | Technical Term | Applicant |
|-----|-------------|---------|----------------|-----------|
| 001 | P6012659A | 850402 | Cache Memory Control | △O✕ |
| 002 | P6012670A | 850402 | Purge Control of Cache Memory | ✕✕△ |
|     |             |        |                |           |

| PF1 | PF2 | PF3 | PF4 | PF5 | PF6 | PF15 |
|-----|-----|-----|-----|-----|-----|------|
| desig | pre | next | disp | d.pri | p.pri | end |

Functional search is completed. Press one of PF keys.

FIG. 14F

Request for Searching Japanese P. and U.M.

( Expiration Date )

| J.P. | Title |
|---|---|
| Sho. 60-12659 | ○○○○○○ ××× |

Claims
××××××××××××
×××××××××
×××××××
×××××
×××××
×××××
×××××
××××
×××
×

Drawing

Image Process.

| KEY | func. |
| PF1 | disp. |
| PF2 | pre |
| PF3 | next |
| PF14 | J.P.P. |
| PF15 | end |
| HELP | menu |

P. T.P.

IMAGE INFORMATION SEARCH NETWORK SYSTEM

BACKGROUND OF THE INVENTION

The present invention relates to an image information search network system in which search stations are connected through a local area network to image information bank stations using optical disk drive units as a recording medium and being commonly used by at least one image search terminal in each of the search stations.

In recent years, an image filing unit using an optical disk drive unit as a recording medium has been in widespread use. An image filing unit of this type stores a large amount of image information and can access and output desired storage information at high speed. However, conventionally, the image filing unit is independently used as a stand-alone system. Therefore, in an office, if the unit is frequently used by department which are relatively distant therefrom, a unit often needs to be separately installed for each department. For this reason, this poses various problems, such as installation space, cost, operation efficiency, and so on.

SUMMARY OF THE INVENTION

The present invention has been made in consideration of the above situation, and has as its object to provide an image information search network system wherein an image information filing unit is used as an image information bank station and search stations including image search terminals arranged at a plurality of locations are configured to commonly use the image information filing unit, so that search and supply of image information filed in the image information filing unit can be commonly allowed by a plurality of terminals relatively distant from the filing unit.

The network system of the present invention comprises:

a communication network;

image information bank station means, connected to the communication network for storing a plurality of image information files each consisting of image information for at least one page, for reading out image information and outputs the readout image information into the communication network, based on an image information transfer request input through the communication network;

file directory means for storing management information for the image information file stored in the image information bank station means;

image information processing means for processing the input image information in response to an input image information processing command; and search station means, connected to the communication network, for generating a search command for searching the image information file and an image information processing command for processing the image information, for accessing the file directory means in response to the search command to read out the management information, for outputting the image information transfer request based on the management information to the image information bank station means through the communication network, for storing the image information input from the image information bank station means through the communication network in response to the image information transfer request, for outputting the stored image information together with the image information processing command to the image information processing means, and for reading out the processed image information to display the processed image information, in accordance with a control data file.

It is another object of the present invention to provide a search method of image information, which can reduce the overhead of a communication network in an image information search network system using the communication network. The method comprises:

generating a search command for designated image information from a search station and outputting an image information transfer request based on the search command to an image information filing station through a communication network;

reading out image information in response to the image information transfer request in the image information filing station, and outputting the readout image information into the communication network based on the image information transfer request;

storing the image information input through the communication network in response to the search command;

generating an image information processing command and processing the stored image information in response to the image information processing command; and storing and displaying the processed patterned image information.

It is still another object of the present invention to provide an image information search network system which can reduce overhead of a communication network. The network system comprises:

terminal means for generating a search command and an image information processing command for designated image information, for storing image information input in response to the search command, for outputting the stored image information together with the image information processing command, and for receiving and storing patterned image information processed in response to the image information processing command to display the patterned image information;

terminal control means for outputting an image information transfer request to the image information filing station through the communication network based on the search command input from the terminal means, for storing the image information input through the communication network in response to the search command, for outputting the image information designated by the search command to the terminal means, for receiving the image information processing command and the image information from the terminal means, for processing the input image information in accordance with the image information processing command, and for outputting the processed patterned image information to the terminal means; and image information filing station means for reading out the image information in response to the image information transfer request and for outputting the readout image information onto the communication network in accordance with the image information transfer request.

According to the image information search network system of the present invention as described above, the following effects can be provided.

Image information file storing units in search stations, which are connected to the image information bank station through a communication network and are installed at a plurality of relatively distant locations from the image information bank station, can commonly receive image information filed in the image information filing unit serving as the image information bank station. Thus, the image information filing unit can be effectively used, and the image information search network system which can reduce installation space and cost can be constructed.

Each image information file storing unit stores image information for a predetermined number of pages (e.g., in this embodiment, three pages) with respect to each of a plurality of image information search terminals connected to a terminal control relay unit in each search station, and image information for designated one page is stored in an AWS (advanced work station) serving as the image information search terminal to display it thereon, thereby reducing the overhead of the communication network and the terminal control relay unit.

File directory units for storing management information for searching image information stored in the image information filing unit are provided to some of the search stations, and can be used by other search stations, thereby simplifying the overall system.

An image information processing unit can be connected directly to the image information search terminal without being connected through the terminal control relay unit, if necessary. Thus, the system can be flexibly constructed in accordance with frequencies of use of individual image information search terminals.

The terminal control relay unit is of a distributed processing type, and can simultaneously execute search processing for the respective image information search terminals. Image file transfer processing and print processing can be performed independently of search processing. In this manner, the terminal control relay unit can independently control the image information search terminals, a printer, a storage unit consisting of an image information file storing unit and a control data file storing unit, and the like, connected thereto.

Since image information is transferred, after search conditions are set by combining search items of image information and the corresponding image information is checked, this shortens the search processing time.

BRIEF DESCRIPTION OF THE DRAWINGS

FIGS. 4A to 4C are diagrams respectively showing operating states of a search program, an image file transfer program, and a printing program in image information search processing;

FIGS. 5A to 5H are diagrams showing changes in areas of image information displayed on the AWS and area displays in response to an image information processing command;

FIG. 6 is a table showing indications of function keys and their meanings;

FIG. 12A is a flow chart showing generation of the image information processing command for image information to be displayed, and FIG. 12B is a flow chart showing processing after generation of the command;

FIGS. 14A to 14G are representations showing changes in screen displays in image information search processing.

DETAILED DESCRIPTION OF THE PREFERRED EMBODIMENT

An image information search network system according to one embodiment of the present invention will be described in detail with reference to the accompanying drawings.

Figure 1:
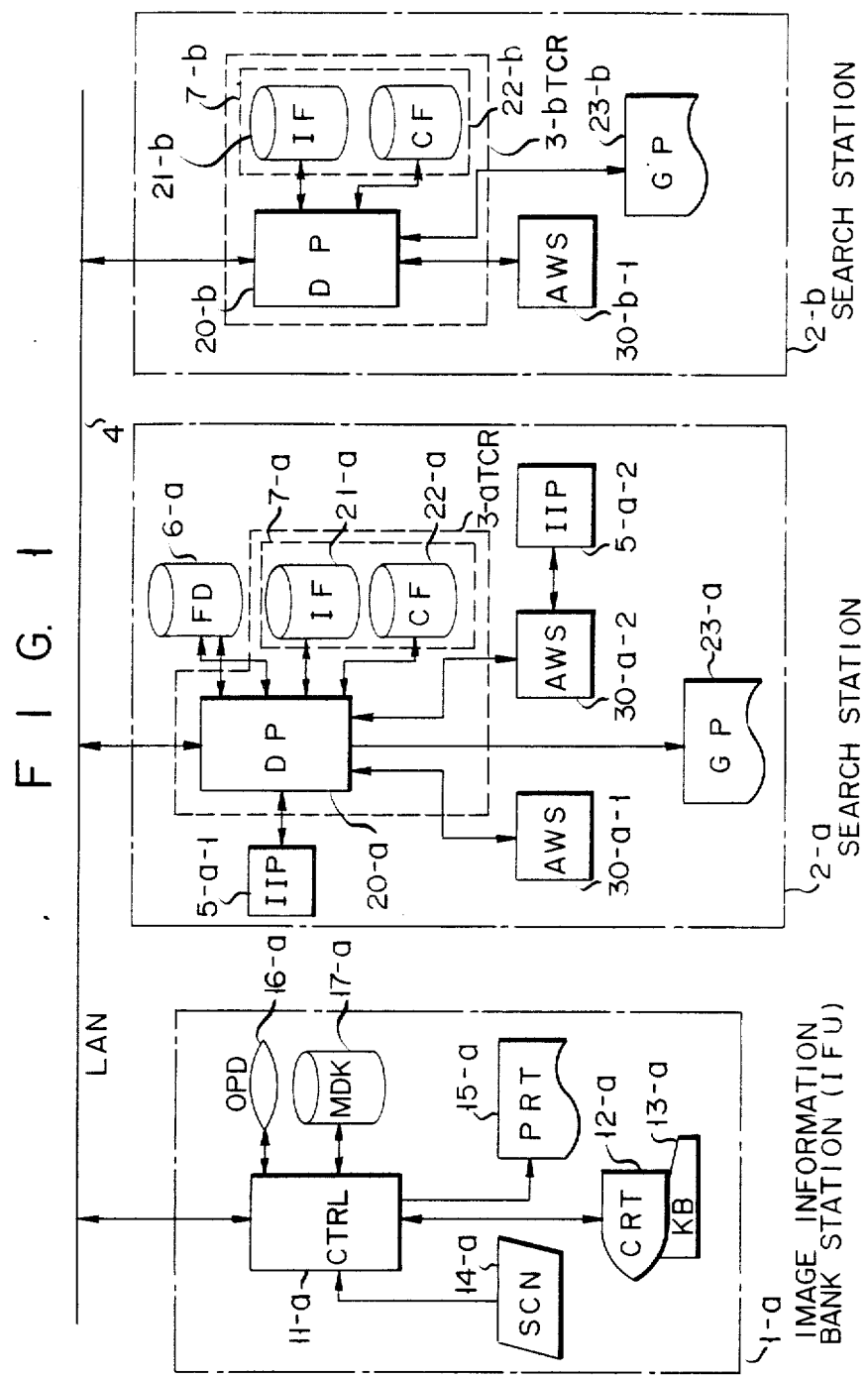
FIG. 1 is a block diagram showing a configuration of an image information search network system according to one embodiment of the present invention.
Figure 2:
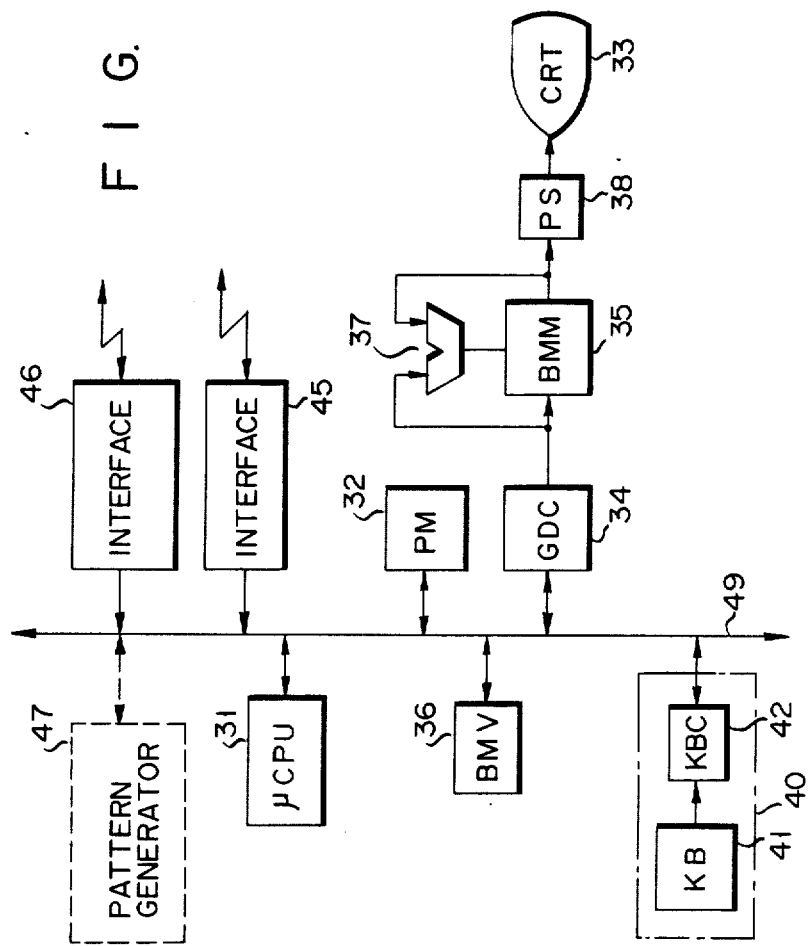
FIG. 2 is a detailed block diagram showing a configuration of an advanced work station (AWS) shown in FIG. 1.
Figure 3:
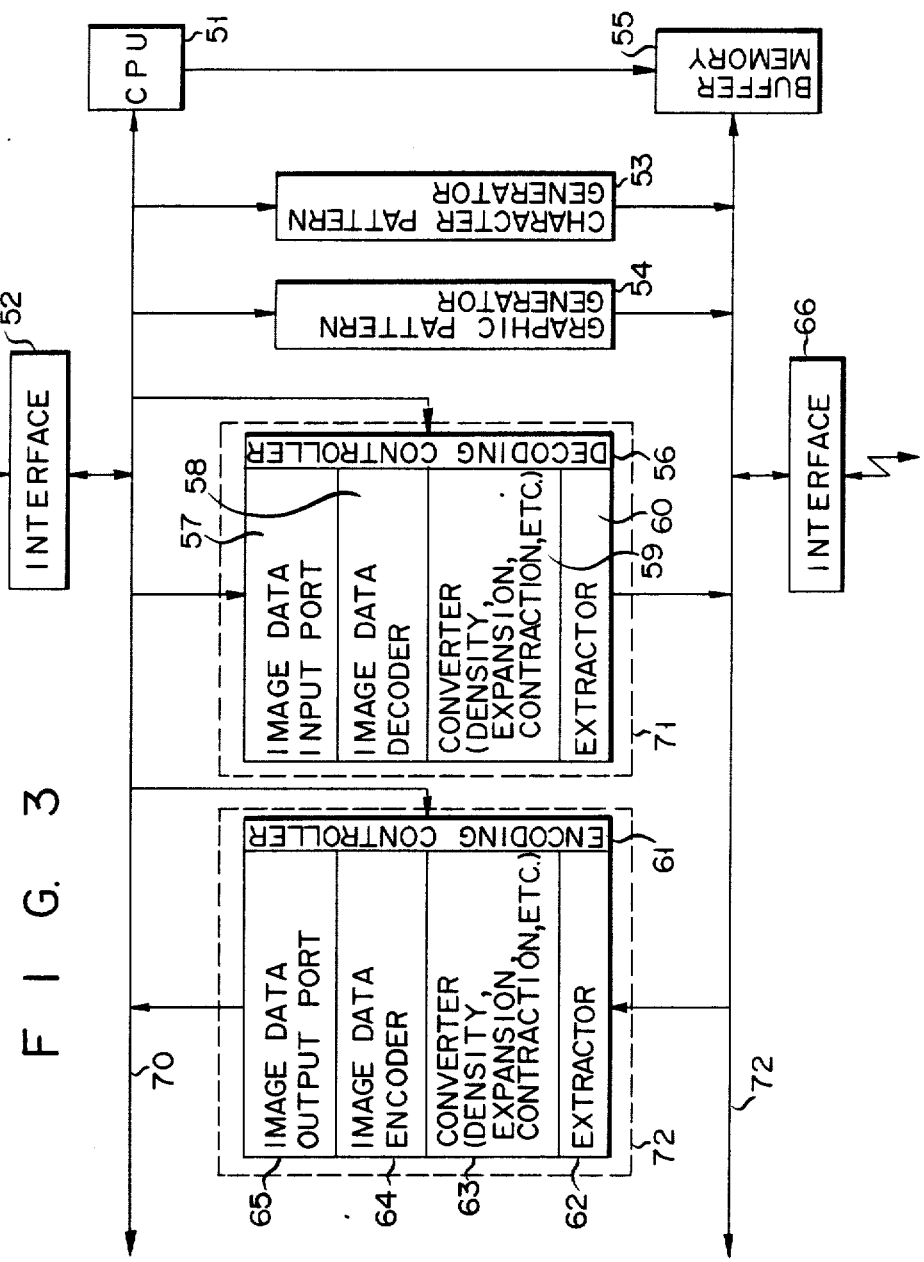
FIG. 3 is a detailed block diagram showing a configuration of an image information processing unit (IIP) shown in FIG. 1.

First, the arrangement of the network system of this embodiment will be described in detail with reference to FIGS. 1 to 3. In the network system, image information filing unit (IFU) 1 serving as an image information bank station storing image information is connected to search stations 2 for searching necessary image information through local area network (LAN) 4.

Note that, for example, when search station 2 is referred to, this represents search stations 2-a, 2-b, . . . This also applies to other components.

IFU 1 comprises: controller (CTRL) 11 for controlling the entire filing unit; CRT display (CRT) 12 for displaying images, operation guides, trouble messages, and the like; keyboard (KB) 13 including alphanumeric keys for inputting various data, ten keys, cursor keys, image information processing keys for expanding, contracting, rotating, and reversing image information, function keys including a kana-kanji conversion key, and the like; scanner (SCN) 14 for reading-in an original to be filed; printer (PRT) 15 for printing out image information, lists, and the like; optical disk drive unit (OPD) 16 for recording image information files; magnetic disk drive unit (MDK) 17 for storing a control data file and the like for searching the image information files which are registered in OPD 16; and an optical disk storage (not shown) for keeping the optical disks.

In response to a control data file transfer request from a search station, CTRL 11 outputs a control data file stored in MDK 17 to the search station indicated by the transfer request through LAN 4.

When an image information transfer request based on management information is input to CTRL 11 from a search station, it accesses OPD 16 to read out the corresponding image information based on the request, and supplies readout image information to the search station indicated by the image information transfer request through LAN 4.

CTRL 11 reads out the control data file stored in MDK 17 upon instruction from KB 13, and output it to CRT 12 to display it, or to PRT 15 to print it. The control data file displayed on CRT 12 can be corrected, or a new control data file can be created and stored in MDK 17. Image information stored in OPD 16 can be similarly output to PRT 15 or CRT 12.

Image information from SCN 14 is stored in OPD 16 upon instruction from KB 13. In this case, since the image information input from SCN 14 is simply quantized, CTRL 11 supplies the quantized image information to predetermined image information processing unit (IIP) 5 (to be described later) to encode it, and retrieves the encoded image information to store it in OPD 16. Then, CTRL 11 transmits management information corresponding to the encoded image information to FD 6. In this manner, image information stored in OPD 16 can be updated or further information can be added.

Search station 2 comprises advanced work station (AWS) 30 as an image information search terminal, terminal control relay unit (TCR) 3 to which AWS 30 is connected, and graphic printer (GP) 23, connected to TCR 3, for printing out the search result.

To some search stations 2 (like station 2-a) are connected image information processing unit (IIP) 5 for processing image information, and file directory unit (FD) 6 storing management information used for searching image information stored in IFU 1.

TCR 3 comprises distributed processing terminal control unit (DP) 20 for controlling a search operation e.g., transfer control of image information, in response to commands from AWS 30, and file storing unit 7 consisting of image information file storing unit (IF) 21 for storing image information and control data file storing unit (CF) 22 for storing a control data file for the search operation.

DP 20 comprises a distributed processing computer, e.g., DP10 available from TOSHIBA CORP., and is connected to LAN 4 through an ethernet communication processor (not shown). DP 20 performs processing such that image information for a plurality of pages (in this embodiment, three pages) is read out from IFU 1 in accordance with the search conditions input from AWS 30 connected thereto so as to store it in file storing unit 7 via LAN 4.

IF 21 and CF 22 are connected to DP 20. IF 21 stores readout image information for three pages, and CF 22 stores a control data file for search processing. For example, in search station 2-a of this embodiment, IF 21-a has image information storing areas each for three pages with respect to AWSs 30-a-1 and 30-a-2 to be controlled by DP 20-a. Note that these three pages include a page to be displayed, the previous page, and the next page.

GP 23 prints image information read out from file storing section 7, in response to a printing command from AWS 30. GP 23 can print image information stored in AWS 30 under control of DP 20.

FDs 6 are included in some of the search stations in the system, and are used commonly by other search stations. More specifically, search station 2-a has FD 6-a, but station 2-b has no FD. When management information is necessary, DP 20-b of search station 2-b sends a management information transfer request to station 2-a through LAN 4 to refer to FD 6-a of station 2-a. In this case, DP 20-a sends the management information to station 2-b which generated the management information transfer request.

Alternatively, when the management information transfer request is generated from another search station, e.g., station 2-b, DP 20-a of station 2-a refers to FD 6-a to obtain management information, and can send an image information transfer request to IFU 1-a based thereon. In this case, DP 20-a can cause the image information transfer request to indicate station 2-b as a destination station of the searched image information. In this way, processing time in other stations can be shortened. The number of FD 6 in the system can be increased depending on frequencies of use.

When LAN 4 and FD 6 are not so frequently used, cost of the system can be reduced by the above arrangement. However, when LAN 4 and FD 6 are frequently used and high-speed access is required, FD 6 can be provided for each station.

This also applies to IIP 5 as well as to FD 6. However, IIP 5 is normally used more frequently than FD 6. Since image information processing takes a great deal of time, IIP 5 (such as IIP 5-a-2 of search station 2-a) can be connected directly to a specific AWS (in this case, AWS 30-a-2). When AWS 30-a-2 connected to IIP 5-a-2 is frequently used, high-speed access of image information is effectively allowed. The network system of the present invention can thus be flexibly constituted.

The operation of a search station will be described with reference to search station 2-a.

DP 20-a generates a control data file transfer request in response to a search operation boot command generated from AWS 30, e.g., AWS 30-a-1. The control data file transfer request is supplied to, for example, IFU 1-a through LAN 4. The control data file supplied from IFU 1-a in response thereto is stored in CF 22-a.

Control data of the control data file stored in CF 22-a cannot be displayed unless it is decoded. Therefore, if the control data need be displayed, the control data is supplied to, for example, IIP 5-a-1 to be converted to patterned data, and is then supplied to and displayed on AWS 30 which has generated the search operation boot command.

When DP 20-a receives the image information search command from AWS 30-a-1, it boots an image file transfer program in response thereto. FD 6-a is accessed based on the input search command to obtain management information corresponding to the command, and an image information transfer request produced by DP 20-a based on the management information is supplied to IFU 1. In response to this request, image information in an image file designated by the request is read out from IFU 1 and is stored in IF 21-a. IF 21 can store image information for three pages. When a file search command is executed, image information for first two pages of the designated image file are read out and stored in IF 21-a. Since the DP 20-a is of distributed processing type, image information is stored in IF 21-a, and image information corresponding to the first page is sent to AWS 30-a-1 which has generated the file search command.

When DP 20-a receives a page search command from AWS 30-a-1, IF 21-a is accessed, and stored image information in IF 20-a corresponding to a page designated by the page search command is sent to AWS 30-a-1. At the same time, an image file transfer program is booted. FD 6-a is accessed based on the input search command to obtain management information, and the image information transfer request is sent to IFU 1. In response to this request, image information corresponding to a page next to or prior to the page designated by the page search command is readout. When the page next to a currently displayed page is designated by the page search command, image information corresponding to a page following the next page is readout. On the other hand, when the page previous to the currently displayed page is designated by the page search command, an image information corresponding to a page previous to the currently previous page is readout. The image information file read out from IFU 1 is stored in IF 21-a.

When DP 20-a receives an image information processing command from AWS 30-a-1, it reads out image information from AWS 30-a-1, and sends it to IIP 5-a-1. IIP 5-a-1 processes the input image information in accordance with the image information processing command, and temporarily stores the processed patterned image information. The patterned image information is supplied to AWS 30-a-1 through DP 20-a and is displayed thereon.

In this embodiment, image information supplied to AWS 30 in response to a file search command or a page search command is encoded image information. Therefore, after the image information is supplied to AWS 30, it is subjected to patterning processing in accordance with the image information processing command to be displayed, as described previously.

When a page printing command is generated from AWS 30, a printing program is booted, and the corresponding image information is read out from IF 21-a. The readout image information is patterned by IIP 5-a-1, and is then supplied to GP 23-a, thus obtaining a printout of the desired image information.

In this case, the printing operation can be performed using image information stored in AWS 30.

When a file printing command is generated from AWS 30, the printing program and an image file transfer program are booted. Image information is read out from IFU 1 and is stored in IF 21-a in the same manner as in the image information search command. The stored image information is then supplied to IIP 5-a-1, processed in the same manner as in page printing, and sent to GP 23-a to be printed. In this embodiment, since a storage area for one page is prepared for printing in IF 21-a, the image file is transferred to IF 21-a page by page. Thus, when image information is transferred from IF 21-a to IIP 5-a-1, image information corresponding to the next page is transferred from IFU 1 to IF 21-a.

In this method, the frequency of use of LAN 4 and IFU 1 is increased. However, if the storage capacity of IF 21-a can be increased, a large amount of image information can be simultaneously transferred.

In the case of AWS 30-a-2, processing based on an image information processing command is performed by IIP 5-a-2.

DP20-a obtains quantized image information from IFU 1 in response to the image information processing command from IFU 1, and supplies it to IIP 5-a-1 to encode it. The encoded image information is sent to IFU 1 through LAN 4.

In the above description, search station 2-a has been described. In search station 2-b, the operation is performed as follows.

In this embodiment, when image information must be searched from IFU 1, for example, when the file search command, page search command, and file printing command are executed, FD 6-a of search station 2-a is referred to through LAN 4 so as to obtain management information. When the image information processing command is executed, IIP 5-a-1 of search station 2-a is referred to through LAN 4.

If a file directory unit and/or an image information processing unit are provided to search station 2-b, search operation speeds of both search stations 2-a and 2-b can be improved.

AWS 30 will now be described in detail with reference to FIG. 2. AWSs 30-a-1 and 30-b-1 have the same arrangement. As shown in FIG. 2, AWS 30 has microprocessor ($\mu$CPU) 31 connected to AWS bus 49, for controlling the internal circuit of AWS 30. AWS 30 has page memory (PM) 32 for storing image information for a designated page to be displayed, which is input through interface 45 connected to AWS bus 49. Bit mover (BMV) 36 connected to AWS bus 49 transfers patterned data input from an external circuit at high speed to bit map memory (BMM) 35 through graphic display controller (GDC) 34 connected to bus 49. BMM 35 stores display image patterned data for one screen (a partial region of a page) displayed on the display screen of CRT display 33. Operational unit 37 simultaneously receives and logically ORs patterned data read out from BMM 35 and that transferred by BMV 36 upon instruction of $\mu$CPU 31, and outputs and stores the result in BMM 35.

GDC 34 is an LSI serving as an interface of bus 49 and CRT 33, and comprises, e.g., $\mu$PD7284, available from NEC CORP. The patterned data stored in BMM 35 is read out therefrom under the control of GDC 34, and is supplied to and displayed on CRT 33 through parallel-to-serial converter (P/S) 38 for converting data into a bit-serial video signal.

Input unit 40 consisting of input section or keyboard (KB) 41 and controller (KBC) 42 is also connected to AWS bus 49.

In addition to the above arrangement, AWS 30-a-2 has interface 46 connected to AWS bus 49 to exchange data with IIP 5-a-2.

When search station 2 using AWS 30 with the above arrangement displays the control data and image information, IIP 5 is used for patterning character code data and graphic code data. As indicated by dotted lines in FIG. 2, if AWS 30 has pattern generator 47 and the storage area of PM 32 has a margin, the control data can be patterned at high speed to be displayed.

The operation of AWS 30 shown in FIG. 2 will now be described.

When an operator operates KB 41, KBC 42 sends code data corresponding to the operation to $\mu$CPU 31 through AWS bus 49. $\mu$CPU 31 determines if the input code data corresponds a command or normal data. If the input code data corresponds to the command, the command is generated and is sent to DP 20 through interface 45. If the input code data is normal data, it is displayed on CRT 33 and is sent to DP 20-a.

If the input data from KB 41 is a file search command or page search command, the command is supplied to DP 20 through interface 45. Until the image information corresponding to the command is input, patterned data corresponding to the control data is input via interface 45. BMV 36 stores the input patterned control data in BMM 35 upon instruction from CPU 31.

Thereafter, image information for one page is transferred from DP 20 to PM 32 and is stored therein. The image information processing command is supplied to IIP 5 via interface 45 and DP 20 together with the image information stored in PM 32. At this time, after $\mu$CPU 31 sends the processing command, it causes BMV 36 to perform data transfer. In addition, $\mu$CPU 31 supplies an operational command to operational unit 37.

When IIP 5 completes its processing, the processed patterned data is read out by DP 20, and is input to AWS 30. In AWS 30, BMV 36 performs data transfer upon instruction from µCPU 31. GDC 34 accesses an address at which data transferred by BMV 36 is to be stored. Data stored at the address is read out and is input to one input terminal of operational unit 37. The other input terminal of operational unit 37 receives the data transferred under the control of BMV 36. Operational unit 37 logically ORs these data, and stores the result at the address described above.

Thereafter, BMM 35 is accessed by GDC 34, and data is displayed on CRT 33 through PS 38.

If data input from input unit 40 is the image information processing command, the same processing described above is performed.

If data input from input unit 40 is the page printing command, the command is sent to DP 20. In DP 20, the printing program is booted, and the corresponding image information stored in IF 21-a is read out and printed. If the data input from input unit 40 is the file printing command, the command is supplied to DP 20 and the image file transfer program and the printing program are booted. Then, the image information is read out from IFU 1 and is printed.

In the case of the page printing command or the file printing command, since the image information stored in IF 21-a is encoded image information, it must be decoded by IIP 5-a-1.

If data input from input unit 40 is a response to the control data, the data is supplied to DP 20 through interface 45. DP 20 sends the next control data to AWS 30 or executes other processing based on the response data. If the next data to be supplied is control data and graphic data need not be changed, the control data is patterned by IIP 5 and is then overwritten on the data already stored in BMM 35 in the same manner as for image information described above.

When IIP 5-a-2 is connected directly to AWS 30-a-2, µCPU 31 sends a processing command to IIP 5 through interface 46 and executes the same operation as described above without being through DP 20.

IIP 5 will now be described with reference to FIG. 3. The principle of IIP 5 is described in Japanese Patent Publication Nos. 59-228528 and 59-228530 entitled "Image Data Processing" filed by the present applicant. Since the contents of these publications are assumed to assist in the understanding of the image information search network system of the present invention, they will be quoted in the following description.

IIP 5 comprises CPU 51, connected to internal bus 70, for controlling the entire operation, interfaces 52 and 66, respectively connected to internal buses 70 and 71, for communicating data with an external device, buffer memory 55, connected to internal bus 71, for storing data, and a processing unit interposed between internal buses 70 and 71. The processing unit comprises character pattern generator 53 for converting character code data into character pattern data, graphic pattern generator 54 for converting graphic code data into graphic pattern data, decoding processor 71, and encoding processor 72. Decoding processor 71 comprises image data input port 57 for receiving image data to be processed, image data decoder 58 for decoding the input image data, converter 59 for performing density conversion, expansion, and contraction operations, extractor 60 for extracting data within a necessary range, and decoding controller 56 for controlling input port 57, decoder 58, converter 59, and extractor 60. Encoding processor 72 comprises extractor 62 for extracting data within a necessary range, converter 63 for performing density conversion, expansion, and contraction operations, image data encoder 64 for encoding input image data, image data output port 65 for outputting image data, and encoding controller 61 for controlling extractor 62, converter 63, encoder 64, and output port 65.

The operation will be described below. Data and a processing command are input from an external device through interface 52. CPU 51 outputs a control command in response to the processing command. For example, if the input command is a character code data conversion processing command, the input character code data is output to character pattern generator 53 to be converted into pattern data. The converted pattern data is stored in buffer memory 55. If the input command is a graphic code data conversion processing command, the same processing as in the character code data conversion processing command is performed.

If the input command is an image information processing command based on, for example, a page search command or a file search command, CPU 51 sends a control command to decoding controller 56 to execute decoding processing, density conversion processing, and extraction processing, so that an upper left region of the page is displayed on CRT 33 of AWS 30.

Image information input through interface 52 is input to decoding processor 56, and is processed in accordance with the control command. The processed image information patterned data is stored in buffer memory 55.

Other image information processing commands, e.g., expansion processing command, are executed in the same manner as the above-mentioned command.

When processing for all the image information is completed, CPU 51 acknowledges DP 20 the completion of the processing. DP 20 instructs AWS 30 to transfer processed data in response to the acknowledgement. When AWS 30 is ready, DP 20 reads out the patterned image information from buffer memory 55 through interface 66, and transfers it to AWS 30.

If the input command is an image information processing command associated with encoding, CPU 51 sends an instruction to encoding processor 72. Image information input through interface 66 is input to and stored in buffer memory 55.

The image information stored in memory 55 is read out upon instruction from CPU 51, and is sent to encoding processor 72. When all the input image information is input, the image information passes through extractor 62 and is then density-converted by converter 63. The density-converted image information is input to image data encoder 64 to be encoded, and is output to an external device through image data output port 65 and interface 52.

As described above, various processing for input image information is executed.

The operation of the image information search network system according to the embodiment of the present invention will be described hereinafter.

A search operation boot command is generated from a work station serving as an image information search terminal, e.g., AWS 30-a-1. In response to this, a control data file transfer request is generated, and a control data file is read out from, e.g., MKD 17-a of IFU 1-a as shown in step S1 in FIG. 7. The readout control data file is transferred to TCR 3-*a* of search station 2-*a* via LAN 4 and is stored in CF 22-*a* of file storing unit 7-*a*. Thereafter, the control data file is executed and read out by DP 20-*a* and is patterned by IIP 5-*a*-1. Then, the control data file is output to AWS 30-*a*-1 and is displayed as a main menu thereon in step S2.

Figures 8A, 8B:
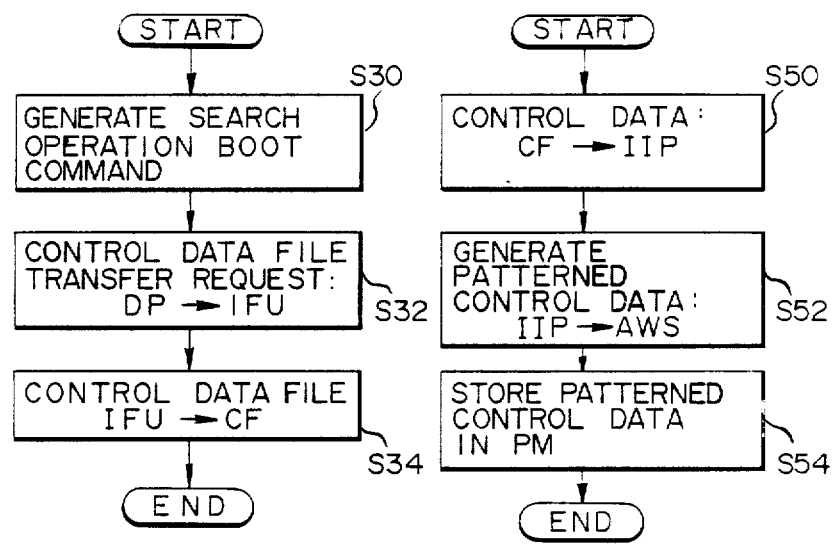
FIG. 8A is a flow chart showing the operation from generation of a search operation boot command to transfer of a control data file.
FIG. 8B is a flow chart showing the operation until control data in the control data file is displayed.

The above operation will be described in more detail with reference to FIG. 8A. When KB 41 of input unit 40 is operated, the operation is coded by KBC 42, and is then sent to μCPU 31. μCPU 31 discriminates the code data from KBC 42, and generates a search operation boot command as shown in step S30 in FIG. 8A.

The search operation boot command is sent to DP 20-*a* through interface 45. Upon reception of the search operation boot command, DP 20-*a* generates a control data file transfer request.

In step S32, DP 20-*a* sends the control data file transfer request to IFU 1-*a* through LAN 4 in accordance with a predetermined transfer frame format. Upon reception of the control data file transfer request, CTRL 11-*a* of IFU 1-*a* drives MKD 17-*a* to read out the control data file, and transfers it to a search station, which generates the control data file transfer request (in this case, search station 2-*a*).

DP 20-*a* of TCR 3-*a* stores the received control data file in CF 22-*a* as shown in step S34.

In step S50, control data of the control data file stored in CF 22-*a* is partially read out by DP 20-*a*, and is supplied to IIP 5-*a*-1. At this time, DP 20-*a* also supplies the character code data conversion processing command to IIP 5-*a*-1.

CPU 51 of IIP 5-*a*-1 instructs character pattern generator 53 to send input data in response to the conversion command. IIP 5-*a*-1 also instructs buffer memory 55 an address at which the patterned data is to be stored. Therefore, character code data of control data input to IIP 5-*a*-1 is received through interface 52, and is supplied to character pattern generator 53. In step S52, the input data is converted to character pattern data. The converted character pattern data is stored in buffer memory 55 through bus 71.

After a series of control data patterning processing is completed, CPU 51 of IIP 5-*a*-1 acknowledges DP 20-*a* completion of code data conversion processing. DP 20-*a* supplies an instruction to AWS 30-*a*-1. μCPU 31 of AWS 30-*a*-1 receives the instruction through interface 45, and drives BMV 36 in accordance therewith to execute bit data transfer. μCPU 31 supplies a transfer ready signal to DP 20-*a* through interface 45.

DP 20-*a* then reads out the patterned data from buffer memory 55 of IIP 5-*a*-1 through interface 66 and sends it to AWS 30-*a*-1. In step S54, BMV 36 receives the patterned data from DP 20-*a* through interface 45, and writes it in BMM 35 under the control of GDC 34.

Figure 14G:
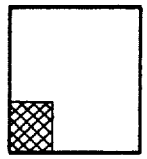

The patterned data written in BMM 35 is output to P/S 38 controlled by GDC 34. P/S 38 supplies the input data to CRT 33 to display it. In this way, a main menu for image information search processing is displayed on the screen of CRT 33, as shown in FIG. 14A.

Figure 7:
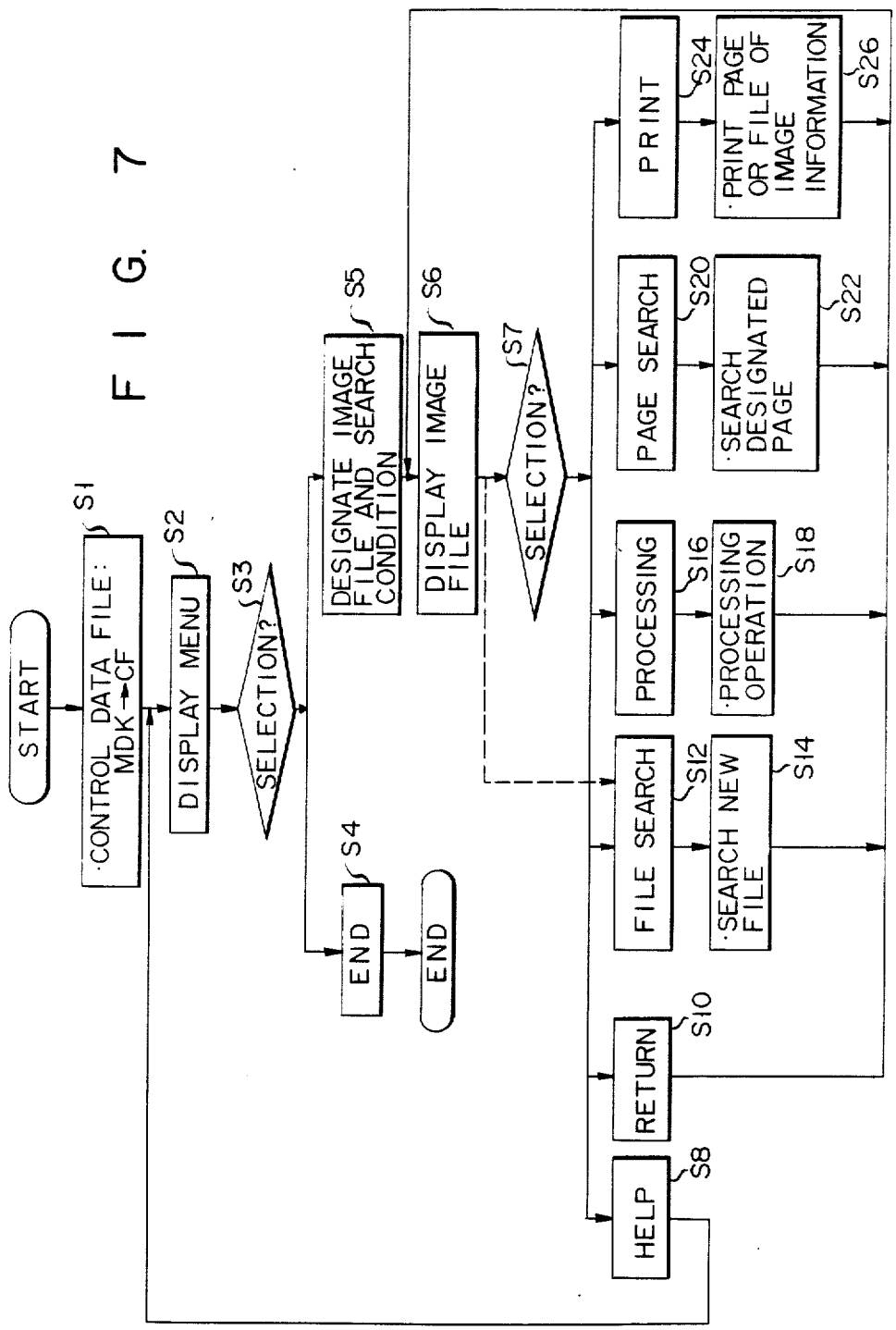
FIG. 7 is a general flow chart for explaining the operation of the embodiment.

When a search operation boot command is generated from any of AWSs 30 connected to DP 20 and the control data file is already stored in CF 22, even if the search operation boot command is generated from another AWS 30 in the same station, the control data file will not be transferred, and the flow after step S50 is executed to display the main menu as shown in step S2 of FIG. 7.

Figure 4A:
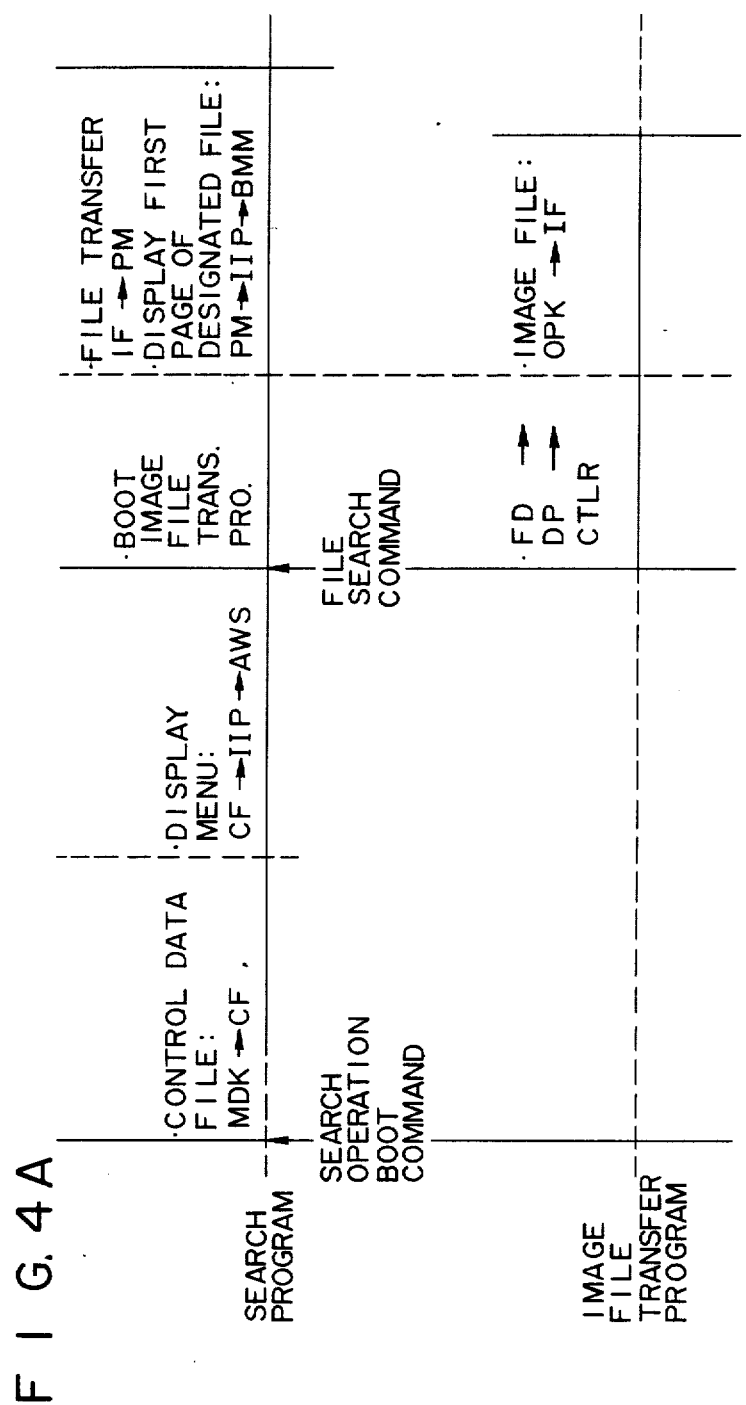
Figure 4C:
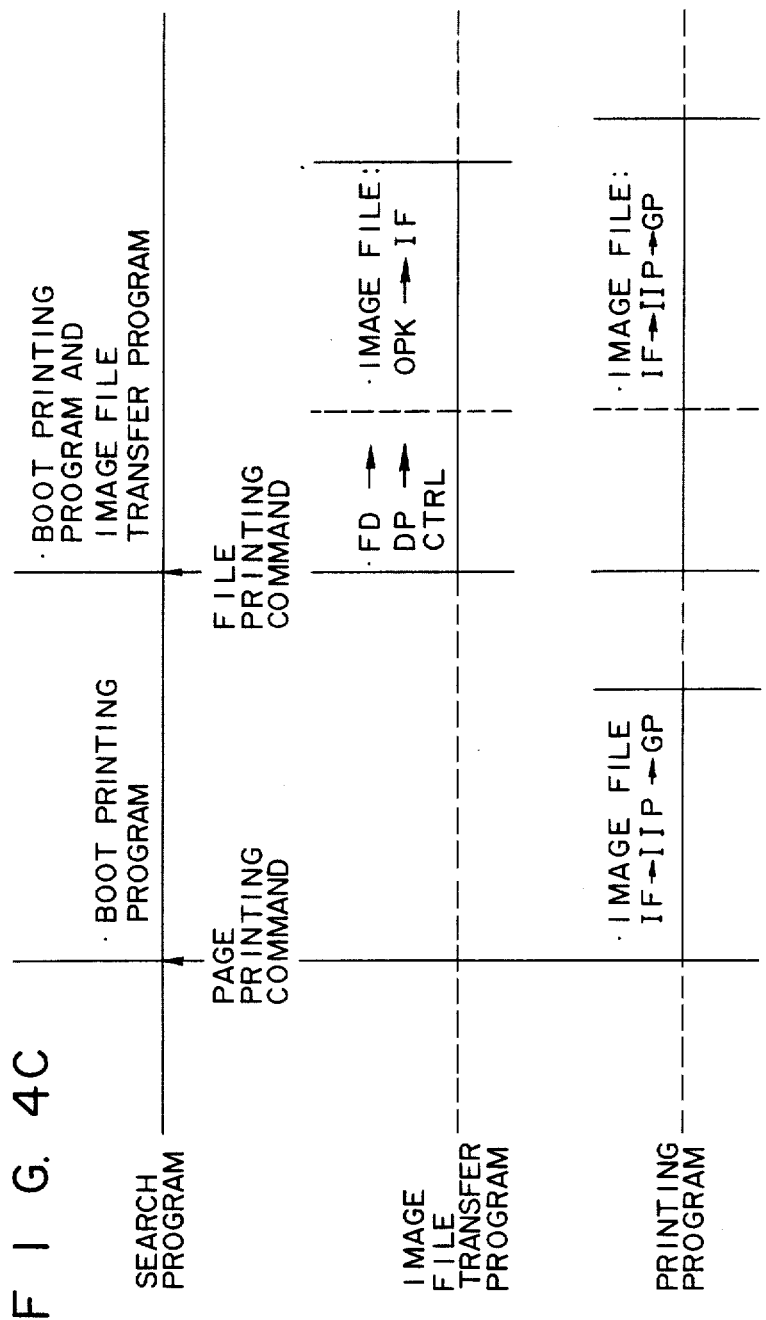

In this case, programs are executed as shown in FIG. 4A. In FIGS. 4A to 4C, states are respresented by a solid line when the program is being executed. In this embodiment, DP 20 executes a search program, an image file transfer program, and a printing program. These programs can be independently executed unless the same hardware component is used. For control data file transfer and control data display, only the search program is executed, as shown in FIG. 4A.

When AWS 30 incorporates pattern generator 47, the control data file can be transferred directly to AWS 30 without being through IIP 5. The operation in this case corresponds to the above-mentioned flow excluding the operation associated with IIP 5.

When search processing is executed by another search station, e.g., search station 2-*b*, IIP 5-*a*-1 of search station 2-*a* is used for patterning control data of the control data file.

The main menu shown in FIG. 14A will be explained below.

Types of image information to be searched are displayed on the upper half of the screen. Input methods of search conditions are displayed on the lower half of the screen. In step S3 of FIG. 7, image information to be searched and search condition are selected.

In this embodiment, objects to be searched include Japanese Patent and Utility Model Publication, Abstract of the Publication, and Abstract of U.S. Patent. Search conditions include direct search and functional search on the basis of some functions. In order to assist the direct search mode, an applicant code table and a technical term table can be selectively displayed. When item "end" is selected in step S3 of FIG. 7, the search processing is completed, and the search program for the corresponding AWS 30 is closed in step S4.

In this case, after the search object is designated upon operation of input unit 40, selection of search conditions is allowed. After the search condition is selected, a message "Verify the selection (Y/N)?" is displayed on a message display area of the lower screen. Upon response to this question, display is switched to the next screen.

If "Japanese Patent and Utility Model Publication" is selected as the search object of image information, "direct search" can be selected in search condition selection. If "Abstract of the Publication" or "Abstract of U.S. Patent" is selected as the search object of image information, "direct search" or "functional search" can be selected in search condition selection.

If "direct search" is designated as the search condition, a message for requesting input of a publication number is displayed on the message display area of the screen. Upon response to this request, the search processing is executed.

If "functional search" is selected, display on the screen is switched as shown in FIG. 14B.

In this case, character code data of the control data is written in BMM 35 of AWS 30-*a*-1 in the same manner as in the main menu described above. The control data is read out from CF 22-*a* by DP 20-*a*, and is supplied to IIP 5-*a*-1. CPU 51 of IIP 5-*a*-1 receives the control data through interface 52 in response to the code data conversion processing command from DP 20-*a*, and sends it to character pattern generator 53 and graphic pattern generator 54. Generators 53 and 54 store the patterned data in buffer memory 55 through bus 71.

DP 20-*a* supplies an instruction to AWS 30-*a*-1. CPU 31 of AWS 30-*a*-1 then controls BMV 36 so as to perform patterned data transfer. For example, at first, character data is patterned and the patterned character data is stored in BMM 35. Then, graphic data is patterned. At the same time, μCPU 31 instructs operational unit 37 to perform operational processing of the patterned data. The patterned graphic data transferred by BMV 36 is input not to BMM 35 but to operational unit 37. Operational unit 37 also receives the patterned data already stored at an address of BMM 35 at which the above-mentioned patterned data is to be stored.

Operational unit 37 calculates a logical sum, i.e., OR of the two input patterned data, and writes the operational result at the designated address. In this manner, the patterned data is overwritten. Thereafter, the patterned data stored in BMM 35 is displayed on CRT 33 through PS 38 under the control of GDC 34. In this manner, information shown in FIG. 14B is displayed on the screen.

If the functional search condition is predetermined, a technical term code or an applicant code need only be input to a column displayed on the upper half of the screen. As for a period, only one condition can be input. In this manner, the functional search condition, i.e., the technical term code, applicant code, or period, is designated. In this embodiment, if a plurality of codes are input for a single search item as the functional search condition, search processing is executed by logically ORing these codes. If designation is made for a plurality of items, search processing is executed by logically ANDing these items.

A search operational command is generated for each code and image information file names corresponding to the code are listed, the image information file names corresponding to the multiple codes are listed using OR and AND operations.

If an operator does not know a code, he or she can operate a HELP key to see a code table. More specifically, the operator moves a cursor into the technical term code or applicant code column and operates the HELP key. For example, if the cursor is in the technical term code column, a technical term code table shown in FIG. 14C is displayed.

As shown in FIG. 14C, the item of the table is displayed on the upper portion of the code table. Below the code table, columns for inputting the technical term codes are displayed. Function keys are displayed at the bottom. In this case, keys PF1 to PF3 and PF15 of the function keys are enabled. Note that PF1 is for designating the search condition, i.e., the technical term code. When key PF2 is depressed, a previous page can be seen, and when key PF3 is depressed, a next page can be seen. If key PF15 is depressed, technical term code input is ended, and the display screen changes to the state shown in FIG. 14B.

In this embodiment, in practice, the technical term code table has a hierarchical tree structure. Therefore, the table shown in FIG. 14C corresponds to 3rd-level term code table.

More specifically, at the 1st level, an item corresponding to code "A" is selected from various technical terms. When function key PF3 is then depressed, the next hierarchical tree is displayed in the same manner as in FIG. 14C. If the operator selects code "AA" and depresses function key PF3, the technical term code table shown in FIG. 14C is displayed. A technical term code selected in the second hierarchical tree is displayed as "AA" above the table. More specifically, code "AA" indicates association with the CPU.

In this state, if function key PF2 is depressed, display returns to the trunk portion of the hierarchical tree, i.e., to the second hierarchical tree. Conversely, if key PF3 is depressed, display advances to the distal end portion of the hierarchical tree, i.e to the fourth hierarchical tree. If function key PF1 is operated to input a code to be selected, the search condition can be set. If another search condition is further designated, the above operation can be repeated.

If a search condition based on applicants is to be added, an applicant code is input in FIG. 14B. When the applicant code is not known, the cursor is moved to the applicant code column and the HELP key is depressed. With this operation, display shown in FIG. 14D is obtained. The display screen is the same as in FIG. 14C, that is, the applicant code table, applicant code input columns, and function keys are displayed. The function keys have the same assignments as in the technical term table.

Since the volume of data is too large, the applicant code table has no hierarchical tree structure, unlike the technical term code table. For this reason, the applicant code can be checked from the previous or next page upon operation of function key PF2 or PF3.

Figure 9:
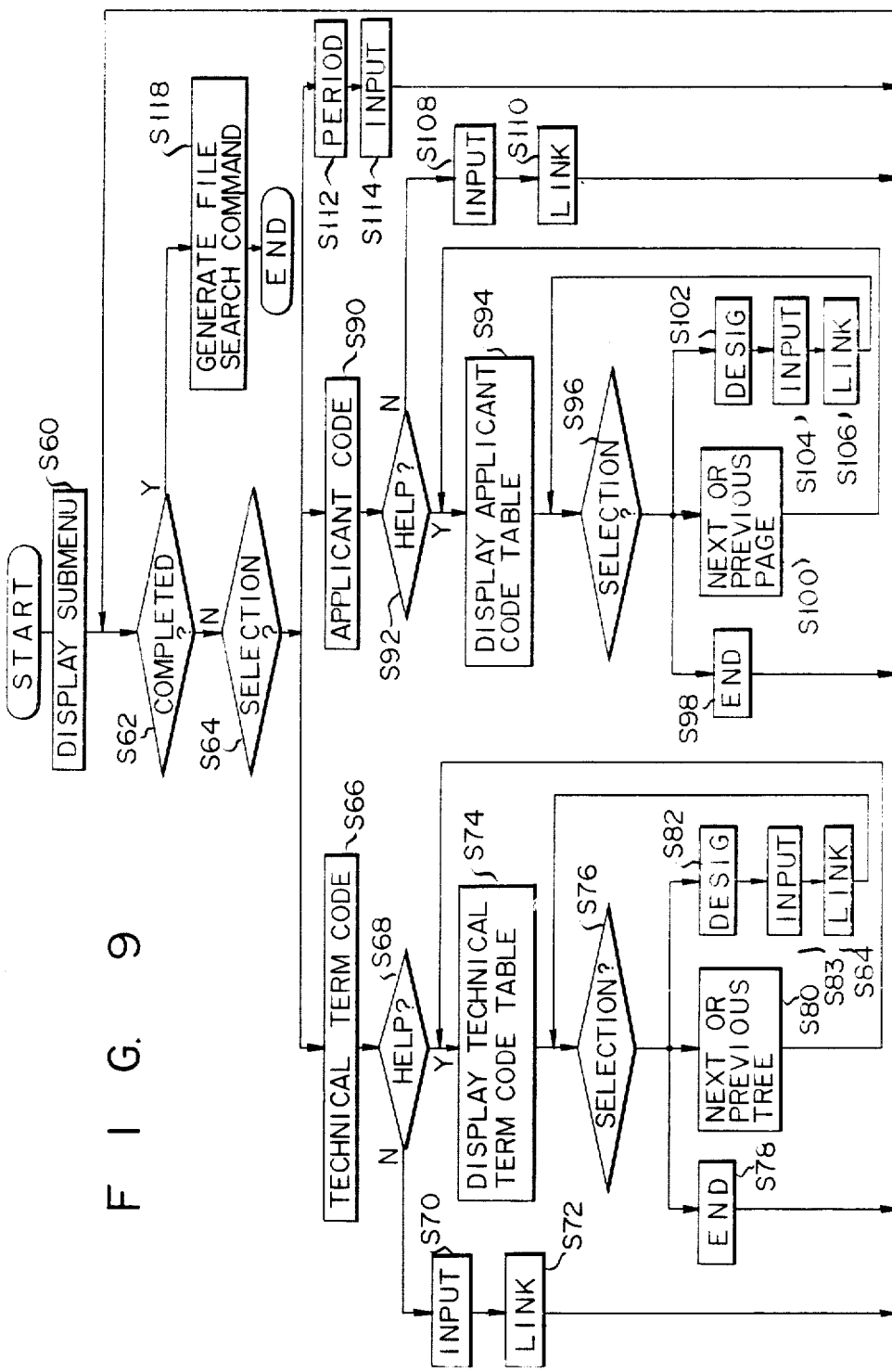
FIG. 9 is a flow chart for setting search conditions upon execution of functional search.

The operation when the functional search mode is designated in FIG. 14A will be described in more detail with reference to FIG. 9.

In step S60, a submenu shown in FIG. 14B is displayed. A question is displayed on the message display area to ask if input of the search condition is completed. If the operator does not respond to this question, "N" is determined in step S62, and the flow advances to step S64.

In step S64, designation of the technical term code, applicant code, or period is selected.

If the search condition is input on the basis of the technical term code, steps S66 and S68 are executed to check if the HELP key is depressed. If N in step S68, this means that the technical term code is directly input by the operator in step S70. In step S72, the input technical term code is linked with the previously-input term codes. Thereafter, step S62 is executed again.

If Y in step S68, the technical term code table is displayed in step S74, and a function is selected by a function key in step S76.

If the "pre" key or "next" key is selected, the flow returns to step S74, and the technical term code table at the designated hierarchical tree level is displayed.

In step S76, if the "desig" key is selected, the technical term is input in step S83, and is linked with the previously-input technical term codes in step S84.

If the "end" key is selected, it is determined that input of the technical term code is completed, and the flow returns to step S62.

If the applicant code is selected in step S64, the same processing as in the technical term code designation is executed.

When the search condition is input on the basis of the applicant code, steps S90 and S92 are executed to check if the HELP key is depressed. If N in step S92, this means that the applicant code is input directly by the operator in step S108. In step S110, the input applicant code is linked with the previously-input applicant codes. Thereafter, step S60 is executed again.

If the HELP key is operated in step S92, the applicant code table is displayed in step S94, and a function is selected by a function key in step S96.

If the "pre" or "next" key is selected, the flow returns to step S94, and the designated applicant code table is displayed.

If the "desig" key is selected in step S96, the applicant code is input in step S104, and is linked with the previously-input applicant codes in step S106.

If the "end" key is selected, it is determined that input of the applicant code is completed, and the flow returns to step S62.

If the period is selected as the search condition in step S64, a period is input in step S114 and, thereafter, step S62 is executed.

In this embodiment, since Japanese Patents and Utility Model Publications and U.S. patents are adopted as objects to be searched as image information, designation of the search condition need be performed only once. However, if various types of image information are to be searched or if search time is to be shortened by limiting a search range, image information as objects to be searched can be sorted in the form of a hierarchical tree structure as in the technical term code.

After the search condition for functional search is input, the display screen returns to the state shown in FIG. 14B. At this time, if the operator responds to the question displayed on the message display area, it is determined that the functional search conditions are completed in step S62, and the search operation is initiated. At this time, a code input by operating input unit 40 of AWS 30-a-1 is determined as the file search command by μCPU 31 in step S118. Thus, image file and the search conditions are designated in step S5 of FIG. 7. The file search command is sent to DP 20-a through interface 45. If the direct search mode is selected as the search method, DP 20-a immediately starts the image file transfer operation.

If the functional search mode is selected as the search method, DP 20-a checks and displays an image information file satisfying the input search condition in response to the input code. FIG. 14E shows the search result.

In the functional search mode, DP 20-a accesses the image information file names satisfying individual search conditions by referring to FD 6-a, and logically operates them to obtain an image information file list designated by the functional search mode. DP 20-a then outputs the list to AWS 30-a-1 to display it. In this case, a display method is the same as in control data display described previously.

The function keys are displayed on the screen in addition to the image information file list, and a message "Press one of PF keys" is displayed on the message display area. The function keys will be described later in detail.

When the cursor is moved to the list to be seen and function key PF1 is operated or when a SEQ number is directly input, DP 20-a starts the file search operation.

A code input from input unit 40 of AWS 30-a-1 is determined as the file search command by μCPU 31, and is sent to DP 20-a through interface 45, thus starting file search processing.

More specifically, when the operator responds to the question shown in FIG. 14B by operating KB 41 of AWS 30-a-1, the code corresponding to the key operation is supplied to μCPU 31 through KBC 42. When a new image information file is accessed, the same steps as shown in steps S12 and S14 are executed. In step S12 in FIG. 7, μCPU 31 discriminates the code, and generates a file search command. In step S14, a new image file is transferred and displayed.

Figure 10:
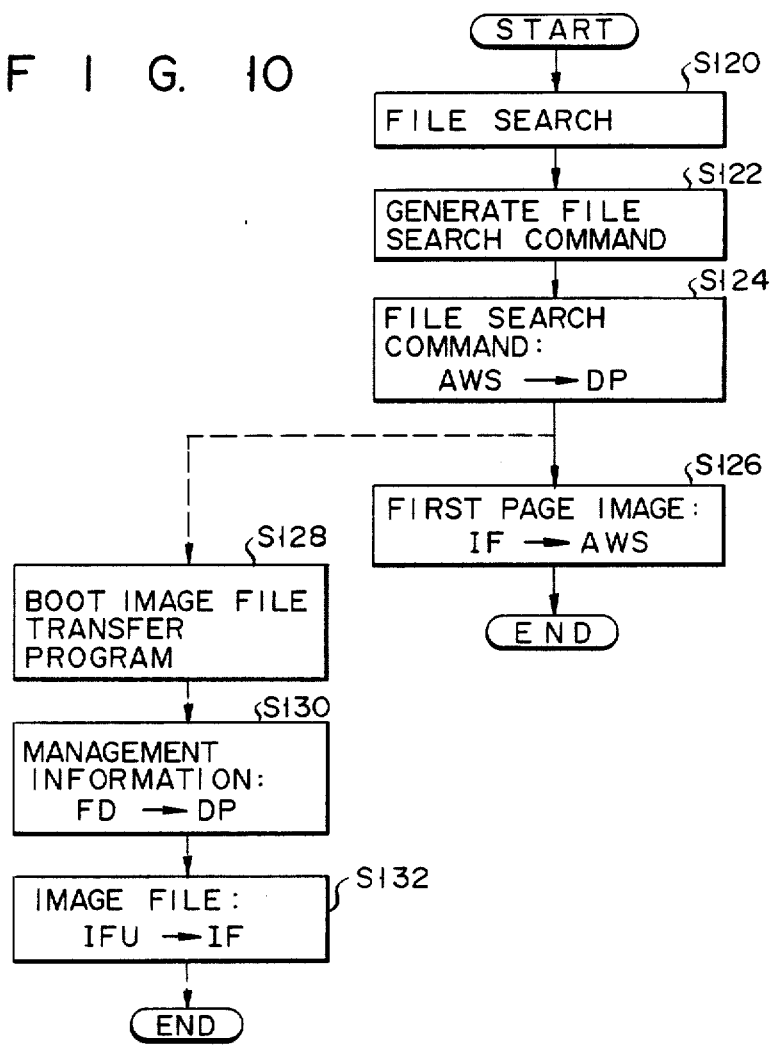
FIG. 10 is a flow chart of file search.

The file search operation will be described below with reference to FIG. 10.

The code input from input unit 40 is determined by μCPU 31 in step S120, and the file search command is generated in step S122. The file search command is supplied to DP 20-a through interface 45 as shown in step S124. DP 20-a boots the image file transfer program in response to the file search command in step S128. DP 20-a outputs the search condition to FD 6-a to obtain management information with reference thereto. Thereafter, an image information transfer request is sent to IFU 1-a through LAN 4 in accordance with the management information. In this case, the image information transfer request includes information indicating search station 2-a as the destination to which the searched image information is to be sent.

In IFU 1-a, OPD 16-a is accessed by CTRL 11-a in accordance with the image information transfer request, and the image information in the image information file designated by the request is read out therefrom. The readout image information is output from CTRL 11-a, and is sent through LAN 4 to DP 20-a of station 2-a, which has generated the image information transfer request. In step S132, DP 20-a stores input image information for the first two pages in IF 21-a.

When DP 20-a receives the image information, it sends image information corresponding to the first page to AWS 30-a-1.

The image information for the first page is stored in PM 32 by μCPU 31. After completion of image information transfer for one page, AWS 30-a-1 outputs a decoding extraction processing command to DP 20-a. At this time, since image information is displayed for the first time, a display area is designated, so that the image information is displayed in the upper left region of the screen.

As shown in step S170 in FIG. 12B, DP 20-a reads out image information from PM 32 of AWS 30-a-1 and supplies it to IIP 5-a-1 in response to the decoding extraction processing command. In step S172, CPU 51 of IIP 5-a-1 supplies a control command to decoding controller 56 in response to the decoding extraction processing command. IIP 5-a-1 processes the input image information in accordance with the input command, and stores the processed image information in buffer memory 55 in step S174.

More specifically, image information is input to image data input port 57 via DP 20-a through interface 52 of IIP 5-a-1. The image information is decoded by image data decoder 58, density-converted by converter 59, and then supplied to extractor 60. The image information extracted by extractor 60 is stored in buffer memory 55.

After the processing, IIP 5-a-1 is signaled to DP 20-a. In response to this, DP 20-a supplies an instruction to μCPU 31 of AWS 30-a-1. μCPU 31 supplies an instruction to operational unit 37 and BMV 36. In step S176, DP 20-a reads out data from IIP 5-a-1 and sends it to AWS 30-a-1. In AWS 30-a-1, BMV 36 transfers the input data to operational unit 37, and unit 37 logically ORs it with the previously-stored data to store the logical sum in BMM 35 (step S178).

Thereafter, the data is read out by GDC 34 and is displayed on CRT 33 through PS 38. In this manner, the searched image information is displayed as shown in FIG. 14F.

FIG. 4A shows the operation states of the search program and the image file transfer program. As can be seen from FIG. 4A, when image information is transferred, the two programs are executed at the same time, and image file transfer and display operations of searched image information are performed simultaneously.

Image information for the first page of the image information file searched by the file search command is displayed as shown in FIG. 14F. At the right side of the screen, explanation for function keys is displayed and the total page number of the searched image information file and a currently displayed page number are displayed therebelow. A display area pattern for indicating a display area of the currently displayed page is displayed below the page numbers.

Explanation of the function keys will be made with reference to FIG. 6.

Function keys PF1 to PF15 and the HELP key are displayed at the right side of the screen.

Function key PF1 has various functions. In the case of FIGS. 14C to 14E, key PF1 serves as a designation key, and in the case of FIG. 14F, the code of another image information file is displayed upon operation of this key. More specifically, if a plurality of image information files are searched by functional search, the number of an image information file other than one currently displayed is displayed upon operation of key PF1. Each time key PF1 is operated, the displayed number is changed, and if the image information file having the displayed code is to be displayed, a return key is operated. Thereby, the file search command is generated, and the processing as described above is executed.

Function key PF2 is used when image information for the previous page is to be displayed. When the first page is currently displayed, key PF2 does not function. Function key PF3 is used when the next page is to be displayed. Function key PF4 is used when a page to be displayed is designated.

Function key PF5 is used when the searched image information file is to be printed. Function key PF6 is used when a page currently displayed on CRT 33 is to be printed.

Function key PF7 is used when displayed image information is to be contracted, in other words, when a wider display area is to be obtained. Conversely, function key PF8 is used when displayed image information is to be expanded. Function keys PF10 to PF13 are used to move the display area vertically and horizontally. For example, if function key PF10 is operated, an area above the currently displayed area is displayed.

When function key PF14 is operated, if the currently displayed image information is "Abstract", image information file corresponding to the "Abstract" is displayed.

When function key PF15 is operated, the display state returns to an initial state wherein the upper left portion of the currently displayed page is displayed. When the HELP key is operated, the display state returns to the main menu.

Figure 11:
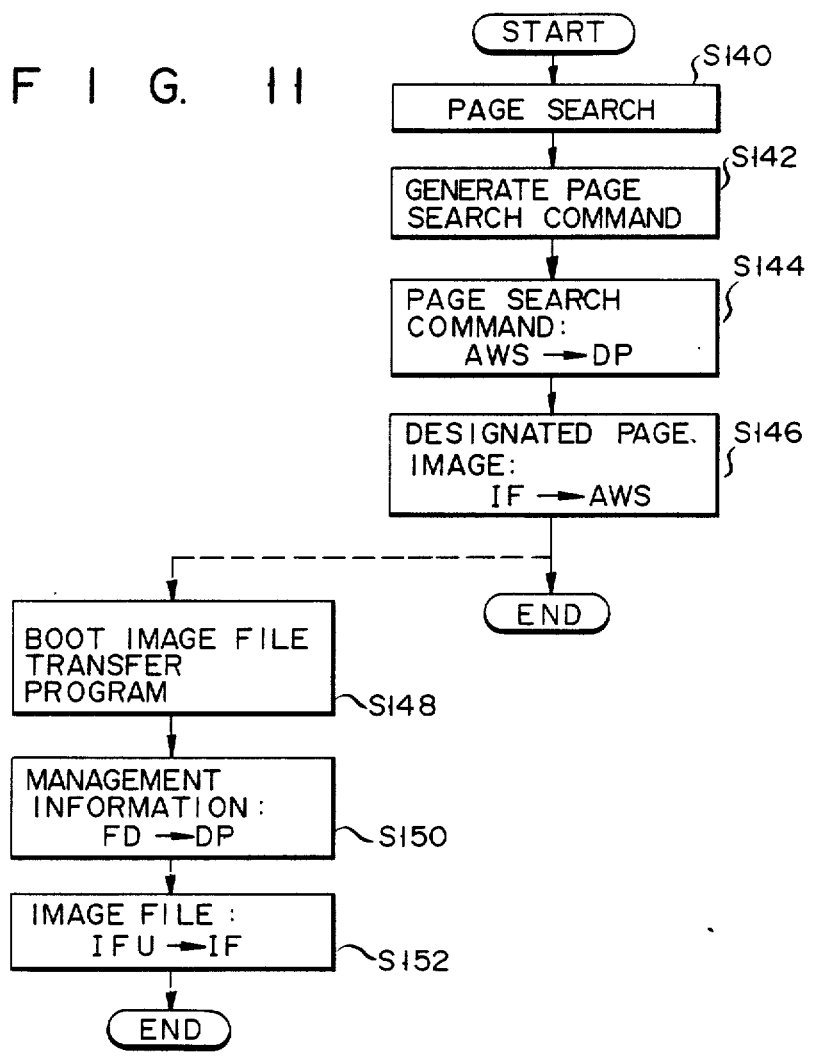
FIG. 11 is a flow chart of page search.

A case when function key PF2 or PF3 is operated will be described below. As shown in FIG. 7, a page search mode is selected in step S7, and the flow advances to step S22 through step S20. In step S22, page designation is made, the image file transfer program is booted, and the designated page of image information is read out and displayed on the screen. This operation will be described with reference to FIG. 11.

If function key PF3 of KB 41 is operated in step S140, the code data is supplied to µCPU 31 via KBC 42. If µCPU 31 determines in step S142 that the code data is a page search command, it sends a page search command to DP 20-a through interface 45 is step S144. In step S146, DP 20-a reads out the image information designated by the page search command from image information stored in IF 21-a (in this case, image information corresponding to a page next to the currently displayed page), and transfers it to PM 32 of AWS 30-a-1.

µCPU 31 of AWS 30-a-1 executes image information processing using IIP 5-a-1 in the same manner as in file search as described above.

If the page search command is input, DP 20-a boots the image file transfer program in step S148. In step S150, DP 20-a refers to FD 6-a to obtain management information for reading out the designated page of image information in step S150. At this time, since the image information file storing the object image information is already known, management information can be obtained by simply outputting the designated page.

In step S152, the image information designated by the page search command is read out from IFU 1-a and is stored in IF 21-a in accordance with the image file transfer program in the same manner as in the case when the file search command is executed.

In this manner, upon operation of function key PF3, the image information for the next page is displayed. FIG. 4B shows the operation states of the search program and the image file transfer program at this time. In the page search operation, the search program and the image file transfer program are executed at the same time in the same manner as in the file search processing.

The operation when function keys PF7 to PF13 are operated will be described with reference to FIG. 12A. In this case, in FIG. 14F, the display area of the image information of the currently designated page displayed on the screen is displayed on the lower right portion of the screen. In this embodiment, the display area indicates that the upper left portion of the page is displayed.

If one of function keys PF7 to PF13 is operated in step S156, one of steps S158 to S169 is executed in accordance with the operated key. Thereafter, the flow chart shown in FIG. 12B is executed.

For example, if function key PF11 is operated, µCPU 31 determines the key operation as a move-down command. µCPU 31 generates the move-down command in step S166, and supplies it to IIP 5-a-1 through DP 20-a together with image information of the corresponding page stored in PM 32. IIP 5-a-1 processes the image information of the corresponding page in the same manner as in the case when the file search command is executed, and the processed image information is stored in buffer memory 55.

Thereafter, the image information subjected to the move-down processing is displayed on CRT 33 of AWS 30-a-1. As a result, the image information corresponding to the displayed area shown in FIG. 5C is displayed on the screen, and an area display at the lower right portion of the screen is made as shown in FIG. 5C. The same processing as above is executed upon operation of other function keys.

When function key PF7 is operated, an expansion command is generated in step S158. When function key PF8 is operated, a contraction command is generated in step S160. When function key PF8 is operated, a rotation command is generated in step S162.

When function key PF10 is operated, a move-up command is generated in step S164. When function key PF11 is operated, the move-down command is generated in step S166. When function key PF12 is operated, a move-left command is generated in step S168. When function key PF13 is operated, a move-right command is generated in step S169. In response to these commands, the image information stored in PM 32 is processed by IIP 5-a-1, and processing is executed as shown in FIG. 12B.

The states when function keys PF7 to PF13 are operated will be explained with reference to FIGS. 5A to 5H.

Referring to FIG. 5A, the left drawing shows an area in the displayed page, and the right drawing shows an area display pattern. On the displayed area of CRT 33, a hatched portion of image information stored in PM 32 is displayed.

When the area display pattern shown in FIG. 5A is displayed, if function key PF11 is operated, the display area is moved downward, and the area display pattern changes as shown in FIG. 5B. If function key PF8 is operated in this state, the display area is expanded, and changes as shown in FIG. 5C. At tis time, a center left end area is selected as the display area.

In this state, if function key PF13 is operated, the area display pattern changes as shown in FIG. 5D. That is, an area size is not changed, and a right neighboring area is displayed. If function key PF7 is operated in this state, the display area is expanded as shown in FIG. 5E and, therefore, display data is contracted.

If function key PF10 is then operated, the display area moves upward without changing the display area size. In this state, if function key PF7 is operated again, image information corresponding to the entire page is displayed on the screen. If function key PF8 is then operated, an upper area of the display area is selected, and the area display pattern changes as shown in FIG. 5H.

If function key PF14 is operated, a patent publication corresponding to a currently displayed abstract is displayed. In this case, the same operation as in the case when the file search command is executed is executed in association with the AWS, DP, and IFU.

At this time, explanation of the function keys, the page number, and the area display pattern is displayed on the screen together with the image information of the patent publication, in the screen shown in FIG. 14F.

A case will be described when function key PF6 is operated.

If function key PF6 or PF7 is operated in step S7 in FIG. 7, printing processing is executed in step S26 through step S24.

Figure 13A:
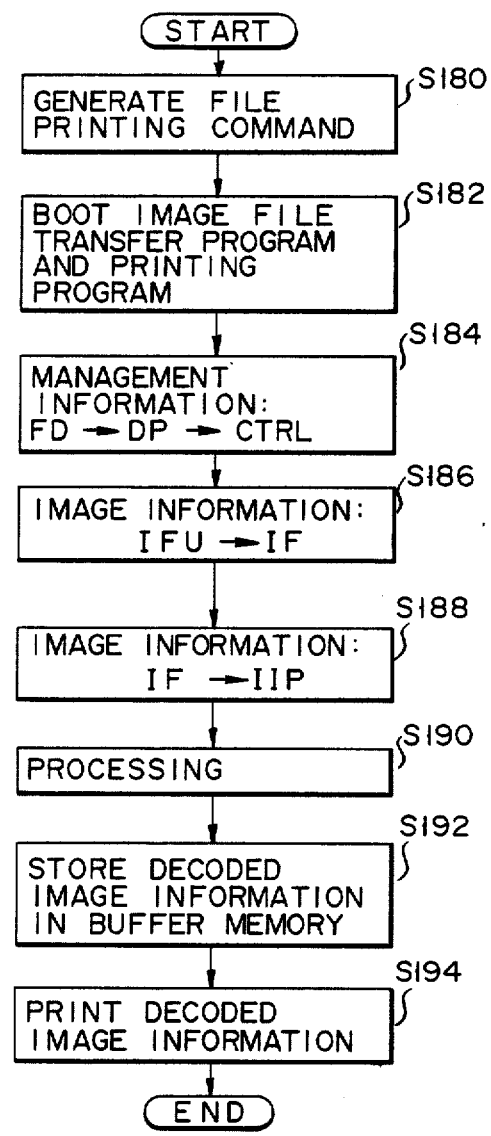
FIG. 13A is a flow chart of file printing.
Figure 13B:
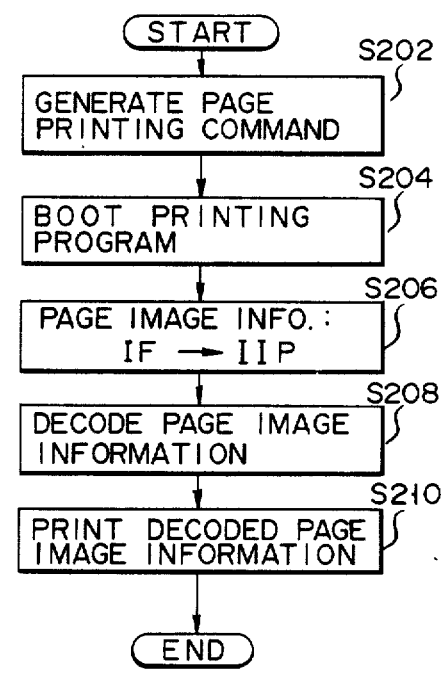
FIG. 13B is a flow chart of page printing.

First, page printing will be described with reference to FIG. 13B.

When function key PF6 on KB 41 of AWS 30-a-1 is operated, the corresponding code data is supplied to μCPU 31 through KBC 42. In step S202, μCPU 31 discriminates the code data, and generates a page printing command.

The page printing command is supplied to DP 20-a through interface 45. DP 20-a boots the printing program in step S204, and reads out the image information corresponding to the page displayed on CRT 33 of AWS 30-a-1 and supplies it to IIP 5-a-1, since the image information stored in PM 32 is the encoded image information and cannot be printed without decoding.

The image information transferred to IIP 5-a-1 is decoded in step S208, and is stored in buffer memory 55. The decoded image information is read out from buffer memory 55 by DP 20-a, and is supplied to GP 23-a to be printed.

A case will be described when function key PF5 is operated.

When function key PF5 on KB 41 is operated, μCPU 31 discriminates the code data in step S180 and generates a file printing command. μCPU 31 supplies the file printing command to DP 20-a through interface 45. Upon reception of the file printing command, DP 20-a boots the image file transfer program and the printing program in step S182.

DP 20-a obtains management information by referring to FD 6-a in accordance with the image file transfer program. DP 20-a supplies the image information transfer request to IFU 1-a based on the management information.

Image information stored in OPD 16-a of IFU 1-a is read out by CTRL 11-a and is transferred to IF 21-a in step S186 in the same manner as in page search processing. The image information stored in IF 21-a is supplied to IIP 5-a-1 in step S188 and is decoded in step S190 in the same manner as in the case when the page printing command is executed, and is stored in buffer memory 55 in step S192. The image information stored in buffer memory 55 is read out by DP 20-a, and is printed by GP 23-a in step S194.

After printing of the first page is completed, image information corresponding to the next page is transferred to IIP 5-a-1, and the same processing as described above is executed. At the same time, image information corresponding to a page next to the current next page is read out from IFU 1-a, and is stored in IF 21-a. The above-mentioned operation is repeated until the entire image file is printed. If IF 21-a has a sufficient storage area, data transfer need not be performed page by page, but image information for a plurality of pages can be transferred, thereby reducing a busy time of the LAN.

FIG. 4C shows the operation state of the three programs, i.e., the search program, image file transfer program, and printing program when function keys PF5 and PF6 are operated. As can be seen from FIG. 4C, three programs can run at the same time.

The operation of the image information search network system of the present invention has been described with reference to AWS 30-a-1 serving as an image information search terminal. A similar operation will be made when AWS 30-a-2 or AWS 30-b-1 is used. In this case, image information is supplied to the IIP or the IIP through the LAN or is directly transferred to the IIP without being through the DP, taking the circuit connections into consideration.

As described previously, if the AWS incorporates a pattern generator, the IIP need not be used when the control data is patterned, thus allowing search processing at a higher speed.

According to the image information search network system of the present invention as described above, the system can be constituted flexibly.

In the above embodiment, IF 21 has a 3-page image information storage area for each AWS 30, and image information for one page is stored in PM 32, but can be arbitrarily determined taking the total memory capacity of the system into consideration. In the above embodiment, image information before decoding is stored in PM 32. However, decoded image information can be stored in units of pages in PM 32 if the memory capacity allows.

What is claimed is:

1. An image information search network system comprising:
   a communication network;
   a bank station coupled to said communication network, said bank station including:
   bank station storing means for storing a plurality of image information files in compressed form, and
   bank station control means for reading out of said bank station storing means and supplying onto said communication network at least one designated page of a designated image information file among the plurality of image information files stored therein in response to input search information;
   a first search station coupled to said communication network and including:
   directory means for storing management information on each page of the plurality of image information files stored in said bank station,
   search station processing means for expanding designated compressed image information file pages input thereto from said communication network into uncompressed form,
   first search station storing means for receiving and storing said expanded pages,
   first search station terminal means for generating search page input thereto from said first search station storing means, and
   first search station control means comprising:
   means for reading out of said first search station storing means and supplying to said first search station terminal means said designated expanded page in response to a first search instruction from said first search station terminal means,
   means for referring to said directory means to obtain the management information on a designated page previous to or next to the designated expanded page presently being displayed in said first search station terminal means in response to said first search instruction,
   means for generating and outputting to said bank station control means via said communication network search information in accordance with said management information,
   means for receiving via said communication network and outputting to said search station processing means the designated page in compressed form, and
   means for receiving from said search station processing means and storing in said search station storing means the expanded designated page; and
   a second search station coupled to said communication network and including:
   second search station storing means for storing a second group of expanded pages,
   second search station terminal means for generating a second search instruction and for displaying a second designated expanded page input thereto, and
   second search station control means comprising:
   means responsive to the second search instruction from said second search station terminal means for reading out of said second search station storing means and supplying to said second terminal means the second designated expanded page among the second group of expanded pages, and
   means for receiving from said second search station control means and storing in said second search station storing means the second expanded designated page,
   wherein said second search station control means further comprises means responsive to the second search instruction request for referring to said directory means to obtain the management information on the designated page previous to or subsequent to the second designated expanded page, and receiving from said search station control means the expanded page.

2. A system according to claim 1, further comprising a third search station coupled to said communication network and including:
   third search station processing means for expanding input third image information file pages;
   third search station storing means for storing a third group of expanded pages;
   third search station terminal means for generating a third search instruction and for displaying an input third designated expanded page; and
   third search station control means responsive to the third search instruction from said third search station terminal means comprising:
   means for reading out of said second search station storing means and supplying to said third search station terminal means the third designated expanded page among the third expanded pages,
   means for generating and outputting to said third search station control means a third search request,
   means for receiving from said bank station control means via said communication network and outputting to said third search station processing means the third image information file page, and
   means for receiving from said third search station processing means and storing in said third search station storing means the expanded page,
   wherein said third station control means further comprises means responsive to the third search request for referring to said directory means to obtain the management information on the designated page previous to or subsequent to the third designated expanded page.

3. A system according to claim 1, wherein said bank station further includes:
   bank terminal means for generating a print instruction, and
   printing means for printing a fourth expanded page,
   wherein said bank station control means further comprises means responsive to the print instruction for generating a third search request and for receiving the designated page expanded by said search station processing means from said search station control means to output the expanded page to said printing means, and
   wherein said first search station control means further comprises means responsive to the third search request for referring to said directory means to obtain said management information and means for receiving from said search station processing means and outputting to said bank station control means the designated page expanded by said search station processing means.

4. A system according to claim 1, wherein said bank station further includes image information file input means for inputting a second image information file, and said bank station control means further includes means for supplying the second image information file to said search station processing means via said first search station control means to compress each page of the second image information file, means for receiving the compressed second image information file from said first search station control means and means to store the compressed second image information file in said bank station storing means, and means for updating the management information stored in said directory means in response to the storage of said second image information file.

5. A system according to claim 1, wherein said search information includes information for designating one image information file from among the plurality of image information files and condition information for designating at least one page of the designated image information file.

6. A system according to claim 1, wherein said first search station further includes printing means for printing the expanded page input thereto, and wherein said first search station terminal means further includes means for generating a print instruction, and wherein said first search station control means further includes means responsive to the print instructions for referring to said directory means to obtain said management information and receiving from said search station processing means and outputting to said printing means the designated page expanded by said search station processing means.

7. A method for searching an image information file comprising:

generating a first search instruction in a first search station;

referring to a file directory in response to the first search instruction to obtain management information regarding a designated page previous to or subsequent to a designated expanded page;

generating search information in accordance with said management information;

reading out from a bank station via a network at least one designated page of a designated image information file among a plurality of image information files in compressed form in response to said search information;

expanding the designated image information file page;

storing the expanded page in a first page buffer;

reading out from the first buffer and displaying a designated expanded page among the expanded pages stored in the page buffer in response to the search instruction;

generating a second search instruction in a second search station;

referring to the file directory in response to the second search instruction to obtain the management information on a second designated page previous to or subsequent to a second designated expanded page; and transferring via the network and storing in a second page buffer the expanded page.

8. A method according to claim 7, further comprising:

updating the management information in the file directory in response to the storage of a new image information file.

9. A method according to claim 7, further comprising:

generating a print instruction, and printing the expanded page.

10. A method according to claim 9, wherein said printing is performed independent of the other said steps.

11. A method according to claim 7, wherein a control file for controlling the method is transferred in response to a search start instruction.

* * * * *